(12) United States Patent
Maeda

(10) Patent No.: US 11,445,156 B2
(45) Date of Patent: Sep. 13, 2022

(54) OPTICAL DEVICE, LIGHT SOURCE DEVICE, AND PROJECTOR

(71) Applicant: SONY GROUP CORPORATION, Tokyo (JP)

(72) Inventor: Yuki Maeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/285,674

(22) PCT Filed: Oct. 16, 2019

(86) PCT No.: PCT/JP2019/040638
§ 371 (c)(1),
(2) Date: Apr. 15, 2021

(87) PCT Pub. No.: WO2020/085164
PCT Pub. Date: Apr. 30, 2020

(65) Prior Publication Data
US 2021/0400243 A1    Dec. 23, 2021

(30) Foreign Application Priority Data
Oct. 26, 2018 (JP) .............................. JP2018-201808

(51) Int. Cl.
*G02B 27/10* (2006.01)
*H04N 9/31* (2006.01)
(Continued)

(52) U.S. Cl.
CPC .......... *H04N 9/3152* (2013.01); *G02B 27/10* (2013.01); *G02B 27/141* (2013.01); *G02B 27/283* (2013.01); *G03B 21/204* (2013.01)

(58) Field of Classification Search
None
See application file for complete search history.

(56) References Cited

U.S. PATENT DOCUMENTS

| 2009/0034284 A1 | 2/2009 | Li et al. |
| 2018/0314140 A1 | 11/2018 | Liao et al. |
| 2019/0155134 A1 | 5/2019 | Komatsu |

FOREIGN PATENT DOCUMENTS

| CN | 102563410 A | 7/2012 |
| CN | 104516180 A | 4/2015 |

(Continued)

OTHER PUBLICATIONS

International Search Report prepared by the Japan Patent Office dated Dec. 2, 2019, for International Application No. PCT/JP2019/040638.

*Primary Examiner* — Elmito Breval
(74) *Attorney, Agent, or Firm* — Sheridan Ross P.C.

(57) ABSTRACT

Provided is an optical device including: a light-emitting layer structure constituted of a first light-emitting layer and a second light-emitting layer; and a wavelength selection unit. The wavelength selection unit is disposed on one side of the light-emitting layer structure. The first light-emitting layer emits light having a first wavelength region. The second light-emitting layer emits light having a second wavelength region based on the light emitted from the first light-emitting layer. The wavelength selection unit allows parts and of the light having the first wavelength region emitted from the light-emitting layer structure to pass through, returns the remaining light to the light-emitting layer structure, and allows the light having the second wavelength region to pass through.

15 Claims, 14 Drawing Sheets

(51) Int. Cl.
*G02B 27/14* (2006.01)
*G02B 27/28* (2006.01)
*G03B 21/20* (2006.01)

(56) References Cited

FOREIGN PATENT DOCUMENTS

| | | |
|---|---|---|
| CN | 105659161 A | 6/2016 |
| CN | 108628071 A | 10/2018 |
| JP | 2011-070088 | 4/2011 |
| JP | 2012128340 A | 7/2012 |
| JP | 2017075973 A | 4/2017 |
| JP | 2017-138347 | 8/2017 |
| JP | 2018092054 A | 6/2018 |
| JP | 2018-189951 | 11/2018 |
| WO | WO 2017/203782 | 11/2017 |

OPTICAL DEVICE, LIGHT SOURCE DEVICE, AND PROJECTOR

CROSS REFERENCE TO RELATED APPLICATIONS

This application is a national stage application under 35 U.S.C. 371 and claims the benefit of PCT Application No. PCT/JP2019/040638 having an international filing date of 16 Oct. 2019, which designated the United States, which PCT application claimed the benefit of Japanese Patent Application No. 2018-201808 filed 26 Oct. 2018, the entire disclosures of each of which are incorporated herein by reference.

TECHNICAL FIELD

The present disclosure relates to an optical device, a light source device equipped with the optical device, and a projector equipped with the light source device.

BACKGROUND ART

Recently light sources of projectors are changing from a lamp light source to a laser-excited fluorescence light source. A fluorescent material used here is mainly a light-emitting material having a wide optical spectral width, such as Ce:YAG and Ce:LuAG. This is because materials which can maintain high fluorescence conversion efficiency are limited under high power laser excitation conditions, and such fluorescent materials as Ce:YAG and Ce:LuAG can withstand high power laser excitation conditions. At the moment, other fluorescent materials are used for a part of projectors having relatively low brightness. On the other hand, projectors have been evolving in direction that exhibit higher brightness and higher image quality. So in order to increase brightness, such fluorescent materials as Ce:YAG and Ce:LuAg must be used at the moment, but in order to increase color gamut, which is one aspect required to improve image quality, the use of these fluorescent materials creates a problem. That is, Ce:YAG and Ce:LuAG have a wide optical spectral width, and a large amount of light is not used and wasted when the color gamut is widened (see FIG. 2C). Details on FIG. 2C will be described later. As a result, it is difficult to implement both an increase of brightness and a widening of color gamut. Further, the wasted light is converted into heat inside the projector, hence increasing load on the heat exhausting structure results in an increase in the size of the overall projector or generating restrictions in the design of the projector.

In order to recycle the light that is wasted when the color gamut is widened, a technique to reflect a partial region of the optical spectrum by a dichroic film, so as to return the light back to the fluorescent layer, was proposed. Specifically, J P 2015-143772 A, for example, discloses a light source of a projector that includes a first wavelength separating portion, constituted of a dichroic film and a fluorescent layer, on a support substrate. More specifically, the light source device disclosed in JP 2015-143772A includes: an excitation light source that emits an excitation light in a first wavelength band; a fluorescence generating portion (light-emitting layer) that is excited by the excitation light and generates fluorescent light in a second wavelength band which is different from the first wavelength band; a first wavelength separating portion (dichroic film) that is disposed on an optical path between the excitation light source and the fluorescence generating portion, and allows to transmit components on a shorter wavelength side out of the second wavelength band, to reflect components on a longer wavelength side out of the second wavelength band, and to transmit the excitation light emitted from the excitation light source; and a reflecting portion that reflects the components on the shorter wavelength side transmitted through the first wavelength separating portion.

For a material to constitute the light-emitting layer, YAG fluorescent material is used, for example. The light-emitting layer is excited by blue excitation light in a first wavelength band, such as 430 to 480 nm (peak wavelength: 450 nm), whereby red fluorescent light in a second wavelength band, such as 520 nm to 750 nm (peak wavelength: 620 nm), is generated. The light-emitting layer is formed by coating transparent resin, in which fluorescent material is mixed, on the dichroic film. By this dichroic film, components on the shorter wavelength side from 580 nm (e.g. green) are cut off.

CITATION LIST

Patent Literature

[PTL 1]
JP 2015-143772 A

SUMMARY

Technical Problem

As mentioned above, in the case of the technique disclosed in PTL 1, the light-emitting layer is excited by the blue excitation light, and light in a 520 nm to 750 nm wavelength band (peak wavelength: 620 nm) is generated. Then components on the shorter wavelength side from 580 nm are cut off by the dichroic film, and the red light is emitted to the outside. FIG. 2C is a schematic diagram of an absorption spectrum of YAG fluorescent material, and an optical spectrum generated when the YAG fluorescent material is excited and emits light. If components on the shorter wavelength side from 580 nm (green) are cut off, a considerable ratio of the light generated in the light-emitting layer is not used for the light source, and a large amount of optical energy is lost. In other words, in the case of the technique disclosed in PTL 1, the light-emitting layer is a single layer and therefore only a part of the regions of the emitted light, which can be absorbed by the fluorescent material itself, can be recycled (see region "C" in FIG. 11A). Further, the reemitted light still has a wide spectral width, hence only a part of the light emission spectrum can be used (see FIG. 2C). In this way, in the case where the light-emitting layer is a single layer, the light cannot be efficiently recycled, and the acquired effect is small.

With the foregoing in view, it is an object of the present disclosure to provide: an optical device having a configuration and structure to efficiently use the light generated in the light-emitting layer, a light source device equipped with the optical device, and a projector equipped with the light source device.

Solution to Problem

To achieve the above object, an optical device of the present disclosure includes: a light-emitting layer structure constituted of a first light-emitting layer and a second light-emitting layer; and a wavelength selection unit. The wavelength selection unit is disposed on one side of the light-emitting layer structure. The first light-emitting layer emits light having a first wavelength region. The second light-emitting layer emits light having a second wavelength region based on the light emitted from the first light-emitting layer. The wavelength selection unit allows a part of the light having the first wavelength region emitted from the light-emitting layer structure to pass through, returns the remaining light to the light-emitting layer structure, and allows the light having the second wavelength region to pass through.

To achieve the above object, a light source device of the present disclosure includes: an optical device including a light-emitting layer structure constituted of a first light-emitting layer and a second light-emitting layer, and a wavelength selection unit; and an energy generation unit. The optical device is constituted of the optical device of the present disclosure.

To achieve the above object, a projector of the present disclosure includes: a light source device equipped with an optical device including a light source layer structure constituted of a first light-emitting layer and a second light-emitting layer, and a wavelength selection unit, and an energy generation unit; an illumination optical system; an image forming unit; and a projection system. The optical device is constituted of the optical device of the present disclosure. An image is formed by the image forming unit using the light passed through the wavelength selection unit, and the image formed by the image forming unit is sent to the projection optical system.

DESCRIPTION OF EMBODIMENTS

Figure 1A:
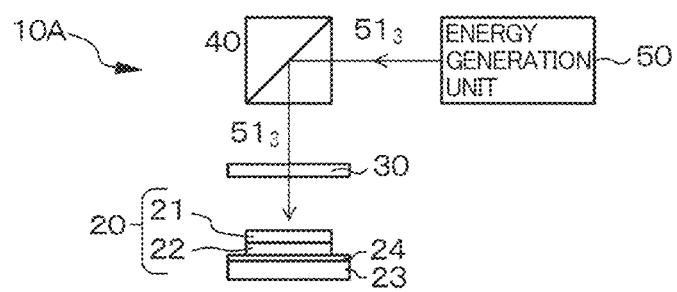
FIG. 1A, FIG. 1B, FIG. 1C and FIG. 1D are conceptual diagrams illustrating the behavior of light in an optical device and a light source device of Embodiment 1.

The present disclosure will be described using the embodiments with reference to the drawings, but the present disclosure is not limited to the embodiments, and various numeric values and materials in the embodiments are examples. This description will follow the following sequence.

1. General description on optical device, light source device and projector of present disclosure 2. Embodiment 1 (optical device, reflection type optical device, light source device and projector of present disclosure)

3. Embodiment 2 (modification of Embodiment 1, optical device having first configuration)

4. Embodiment 3 (another modification of Embodiment 1, optical device having second configuration)

5. Embodiment 4 (still another modification of Embodiment 1)

6. Embodiment 5 (still another modification of Embodiment 1, transmission type optical device)

7. Embodiment 6 (still another modification of Embodiment 1)

8. Other

General Description on Optical Device, Light Source Device and Projector of Present Disclosure In an optical device of the present disclosure, an optical device which constitutes a light source device of the present disclosure, and an optical device which constitutes a projector of the present disclosure (these light source devices may collectively be referred to as an "optical device and the like" of the present disclosure herein below), a wavelength selection unit allows light in a first wavelength band and a light in a second wavelength band to pass through, out of light in the first wavelength region emitted from a light-emitting layer structure, and a second wavelength region and the second wavelength band may at least partially overlap. The second wavelength band is assumed to be on the longer wavelength side than the first wavelength band. The light having the first wavelength band can be a green light, and the light in the second wavelength region and the light in the second wavelength band can be a red light. The second wavelength region and the second wavelength band may partially overlap, the optical spectrum of the second wavelength band may be included in the optical spectrum of the second wavelength region, and the optical spectrum of the second wavelength region may be included in the optical spectrum of the second wavelength band.

In the optical device and the like of the present disclosure, including the above mentioned preferred embodiment, the second light-emitting layer may further emit light having the second wavelength region, based on the remaining light in the first wavelength region, which is returned to the light-emitting layer structure by the wavelength selection unit. Here the color of the remaining light in the first wavelength region is primarily yellow (wavelength: 530 nm to 625 nm), but may include blue (wavelength: 480 nm to 530 nm) in some cases. In the following description, the yellow light included in the remaining light in the first wavelength region may be referred to as "yellow remaining light", and the blue light included therein may be referred to as "blue remaining light".

In the optical device and the like of the present disclosure, including the above mentioned various preferred embodiments, the first light-emitting layer may take a form of not absorbing the remaining light in the first wavelength region, which was returned to the light-emitting layer structure by the wavelength selection unit. "Not absorbing light" here means that the first light-emitting layer absorbs only 9% or less of the quantity of the remaining light in the first wavelength region, which was returned to the light-emitting layer structure by the wavelength selection unit. Specifically, this means that the first light-emitting layer absorbs only 1% or less of the yellow remaining light, and the first light-emitting layer absorbs only 8% or less of the blue remaining light.

Furthermore, in the optical device and the like of the present disclosure, including the above mentioned various preferred embodiments, a lens system may be disposed between one side of the light-emitting layer structure and the wavelength selection unit, and the light that passes through the lens system and propagates to the wavelength selection unit may be converted into collimated light by the lens system. It is preferable to dispose the light-emitting layer structure at the focal position of the lens system, but the embodiment is not limited to this. The lens system has positive power, and the configuration and structure of the lens system may be a well-known configuration and structure. The light which passed through the lens system becomes collimated light.

Furthermore, in the optical device and the like of the present disclosure, including the above mentioned various preferred embodiments, the first light-emitting layer may emit light having the first wavelength region based on energy supplied by an energy generation unit, and in this case, the energy generation unit may be constituted of a light-emitting element, and the energy supplied to the first light-emitting layer by the energy generation unit may be light having a third wavelength region. Specifically, the light having the third wavelength region may be blue light or ultraviolet light, and the light-emitting element may be semiconductor laser elements or light-emitting diodes (LEDs).

In the preferred configuration of the optical device and the like of the present disclosure, a light reflection unit may be disposed on another side of the light-emitting layer structure, and the light from the energy generation unit may enter the light-emitting layer structure from the one side of the light-emitting layer structure. The optical device having this mode is referred to as "reflection type optical device" for convenience. The reflection type optical device may further include a light transmission/reflection unit. The light from the energy generation unit may be reflected by the light transmission/reflection unit, passes through the wavelength selection unit, and enters the light-emitting layer structure, and the light, which was emitted from the light-emitting layer structure and passed through the wavelength selection unit, may pass through the light transmission/reflection unit.

It is preferable that the lens system is disposed between the light transmission/reflection unit and the wavelength selection unit, but in some cases, the lens system may be disposed between the wavelength selection unit and the light-emitting layer structure. Further, in these cases, [the reflection type optical device] may further include: a phase difference plate that controls the light from the energy generation unit to be a first polarization state and a second polarization state; and a second light reflection unit. The phase difference plate may be disposed between the energy generation unit and the light transmission/reflection unit. In the first polarization state, the light which passed through the phase difference plate and entered the wavelength selection unit may be reflected by the light transmission/reflection unit, pass through the wavelength selection unit, and enter the light-emitting layer structure, and in the second polarization state, the light may pass through the light transmission/reflection unit, is reflected by the second light reflection unit, reenter the light transmission/reflection unit, and is reflected by the light transmission/reflection unit. The optical device having this mode is referred to as an "optical device having first configuration" for convenience. Alternatively, in these cases, a phase difference plate may be disposed between the light transmission/reflection unit and the wavelength selection unit, and a second light transmission/reflection unit may be disposed between the phase difference plate and the wavelength selection unit. Here light which was reflected by the light transmission/reflection unit and passed through the phase difference plate may be partially reflected by the second light transmission/reflection unit, reenter the phase difference plate, and pass through the phase difference plate and the light transmission/reflection unit, and light which passed through the phase difference plate and the second light transmission/reflection unit (remaining light) may pass through the wavelength selection unit and enter the light-emitting layer structure. The optical device in this mode is referred to as an "optical device having second configuration" for convenience.

Alternatively, in the preferred configuration of the optical device and the like of the present disclosure, a light transmission/reflection unit may be disposed on the other side of the light-emitting layer structure. Light from the energy generation unit may pass through the light transmission/reflection unit and enter the light-emitting layer structure from the other side of the light-emitting layer structure, and light emitted from the light-emitting layer structure may be reflected by the light transmission/reflection unit. The optical device in this mode is referred to as a "transmission type optical device" for convenience.

The illumination optical system, the image forming unit and the projection optical system constituting the projector of the present disclosure may be a well-known illumination optical system, image forming unit and projection optical system.

In the optical device and the like of the present disclosure, the first wavelength is 470 nm to 900 nm, the first wavelength band is 480 nm to 530 nm, the second wavelength band is 530 nm to 625 nm, and the second wavelength region is 590 nm to 680 nm, for example, but the embodiment is not limited to these ranges. Such expressions as "part of light" and "remaining light" are used, but the totality of "part of light" and "remaining light" is not necessarily 1.00, and in some cases a loss of light may be generated.

A material constituting the first light-emitting layer may be such a fluorescent material as Ce:YAG and Ce:LuAG, or the first light-emitting layer may be constituted of a self light-emitting element (specifically, a single layer structure or multi-layer structure of LEDs including quantum dot LEDs, organic electroluminescence (EL) elements or inorganic El elements). In these cases, a material constituting the second light-emitting layer that emits red light may be quantum dots, Eu:CASN that is fluorescent material of which basic composition is $AlSiN_3$:Eu, and Eu:SCASN that is a fluorescent material of which basic composition is (Sr, Ca)$AlSiN_3$:Eu or $K_2SiF_6$:$Mn^{4+}$(KSF). Further, a material constituting the first light-emitting layer may be Eu:SiAlON, Eu:CASN or Eu:SCASN, and in this case, a material constituting the second light-emitting layer that emits red light may be quantum dots. If the second light-emitting layer is constituted of quantum dots, the absorption spectrum can be adjusted to a desired absorption spectrum by material design, hence the entire light-emitting layer structure can be easily optimized. It is preferable to laminate the first light-emitting layer and the second light-emitting layer, and in this case, a structure in which the fluorescent layer and the quantum dot layer are held by resin binder or glass binder, a sintered body structure containing fluorescent material or quantum dots, a structure where fluorescent material or quantum dots are filled in spaces, and the like may be used. The structure in which the first light-emitting layer and the second light-emitting layer are laminated may be a disk type rotating body or a fixed type non-rotating body. The first light-emitting layer and the second light-emitting layer are disposed on a first surface of a support substrate. In the case of the reflection type optical device, the support substrate may be a substrate constituted of such metals and alloys of aluminum, copper and molybdenum, or a substrate constituted of ceramic, sapphire or glass. In the case of the transmission type optical device, the support substrate may be a substrate constituted of sapphire or glass, the wavelength selection unit may be a dichroic mirror.

In the case where the first light-emitting layer is constituted of a fluorescent material, the energy generation unit may be constituted of a light-emitting element, for example, as mentioned above. In this case, the energy generation unit may include a unit to inject current into the light-emitting element, for example. On the other hand, in the case where the first light-emitting layer is constituted of self light-emitting element, the energy generation unit is constituted of the first light-emitting layer itself, and the first light-emitting layer self-emits the light having the third wavelength region (specifically, blue light or ultraviolet light).

In the reflection type optical device, the light reflection unit disposed on the other side of the light-emitting layer structure may be, for example, a thin metal film which is formed on a first surface of the support substrate (or in some cases, on a second surface of the support substrate facing the first surface) (such as, a thin film of silver, aluminum or an alloy thereof), a dielectric multilayer film, an inorganic sintered material film, or the like, or the light reflection unit may be a reflection mirror which is disposed so as to face the support substrate.

Further, in the reflection type optical device, the light transmission/reflection unit may be constituted of a dichroic mirror or a polarization beam splitter, for example. In the case of using the dichroic mirror as the light transmission/reflection unit, the light transmission/reflection unit may be designed such that [A] the light from the energy generation unit (e.g. blue light) is reflected by the light transmission/reflection unit, and [B] the light, which was emitted from the light-emitting layer structure and passed through the wavelength selection unit (e.g. green light and red light), passes through the light transmission/reflection unit. Here the light from the energy generation unit (e.g. blue light), which entered the light-emitting layer structure and is emitted directly from the light-emitting layer structure (e.g. blue light), or the light reflected by the light-emitting layer structure (e.g. blue light), is reflected by the light transmission/reflection unit, and is returned to the energy generation unit. In the case of using the polarization beam splitter for the light transmission/reflection unit, the light transmission/reflection unit may be designed such that [C] the light in the s polarization state from the energy generation unit (e.g. blue light) is reflected by the light transmission/reflection unit, and [D] the light, which was emitted from the light-emitting layer structure and passed through the wavelength selection unit (e.g. green light and red light), passes through the light transmission/reflection unit.

Further, in the optical device having the first configuration, the phase difference plate that controls the light from the energy generation unit to be the first polarization state and the second polarization state may be a ¼ wavelength plate ($\lambda$/2 wavelength plate), for example. In order to control the light to be the first polarization state and the second polarization state, the $\lambda$/2 wavelength plate may be rotated. In this case, a polarization beam splitter may be used for the light transmission/reflection unit. The polarization state of the light from the energy generation unit may be uniformly set to a p polarization state using the polarization conversion element. For example, in a case where light from the energy generation unit immediately before entering the $\lambda$/2 wavelength plate was in the p polarization state or s polarization state, and the light was emitted from the $\lambda$/2 wavelength plate in the p polarization state by the rotating $\lambda$/2 wavelength plate. The light passes through the light transmission/reflection unit in the second polarization state (p polarization state), is then reflected by the second light reflection unit, and reenters the light transmission/reflection unit. If a ¼ wavelength plate ($\lambda$/4 wavelength plate) is disposed between the light transmission/reflection unit and the second light reflection unit, the polarization state of the light, which passed through the $\lambda$/4 wavelength plate twice (passing through and returning) and reentered the light transmission/reflection unit, becomes the s polarization state, and this light is reflected by the light transmission/reflection unit constituted of the polarization beam splitter. On the other hand, in a case where light was emitted from the $\lambda$/2 wavelength plate in the s polarization state by the rotating $\lambda$/2 wavelength plate, the light in the first polarization state (s light state) is reflected by the light transmission/reflection unit constituted of the polarization beam splitter, passes through the wavelength selection unit, and enters the light-emitting layer structure. If the ¼ wavelength plate ($\lambda$/4 wavelength plate) is disposed between the light transmission/reflection unit and the wavelength selection unit, the light, which was emitted from the light-emitting layer structure and passed through the wavelength selection unit (e.g. green light and red light), passes through the $\lambda$/4 wavelength plate and the light transmission/reflection unit. On the other hand, the light emitted from the energy generation unit (e.g. blue light), which was reflected by the light transmission/reflection unit constituted of the polarization light beam splitter, passed through the $\lambda$/4 wavelength plate, entered the light-emitting layer structure, and was directly emitted from the light-emitting layer structure (e.g. blue light), or the light, which was reflected by the light-emitting layer structure, passes through the $\lambda$/4 wavelength plate and becomes the p polarization state, and passes through the light transmission/reflection unit constituted of the polarization light beam splitter. However, the light, which was scattered by the light-emitting layer structure (e.g. blue light in the non-polarized state), passes through the λ/4 wavelength plate and becomes the s polarization state, is reflected by the light transmission/reflection unit constituted of the polarization light beam splitter and returns to the energy generation unit.

Further, in the optical device having the second configuration, the light transmission/reflection unit may be constituted of a polarization beam splitter, the phase difference plate may be constituted of a λ/4 wavelength plate, and the second light transmission/reflection unit may be constituted of a dichroic mirror, which transmits a part of light having the third wavelength region and reflects the remaining light. The polarization state of the light from the energy generation unit may be uniformly set to the s polarization state using the polarization conversion element. The light from the energy generation unit in this polarization state is reflected by the light transmission/reflection unit constituted of the polarization beam splitter, and enters the phase difference plate constituted of the λ/4 wavelength plate. The light reflected by the second light transmission/reflection unit reenters the phase difference plate (λ/4 wavelength plate), is emitted from the phase difference plate in the p polarization state, and passes through the light transmission/reflection unit constituted of the polarization beam splitter. The light that passed through the second light transmission/reflection unit (e.g. blue light in the s polarization state), on the other hand, enters the light-emitting layer structure via the wavelength selection unit. The light, which was emitted from the light-emitting layer structure via the wavelength selection unit, passed through the second light transmission/reflection unit, and entered the phase difference plate constituted of the λ/4 wavelength plate (e.g. green light and red light), is emitted from the phase difference plate, and passes through the light transmission/reflection unit constituted of the polarization beam splitter. On the other hand, the light, which was emitted from the energy generation unit (e.g. blue light), entered the light-emitting layer structure, and was directly emitted from the light-emitting layer structure (e.g. blue light), or the light, which was reflected by the light-emitting layer structure, passes through the phase difference plate (λ/4 wavelength plate) and becomes the p polarization state, and passes through the light transmission/reflection unit (polarization beam splitter), but the light scattered by the light-emitting layer structure (e.g. blue light in the non-polarized state) passes through the phase difference plate constituted of the λ/4 wavelength plate and becomes the s polarization state, is reflected by the light transmission/ reflection unit constituted of the polarization light beam splitter, and returns to the energy generation unit.

In the transmission type optical device, the light transmission/reflection unit may be constituted of a dichroic mirror. In the case of using the dichroic mirror for the light transmission/reflection unit, the light transmission/reflection unit may be designed such that [E] the light emitted from the energy generation unit (e.g. blue light) passes through the light transmission/reflection unit, and [F] the light emitted from the light-emitting layer structure is reflected by the light transmission/reflection unit.

Embodiment 1

Figure 11A:
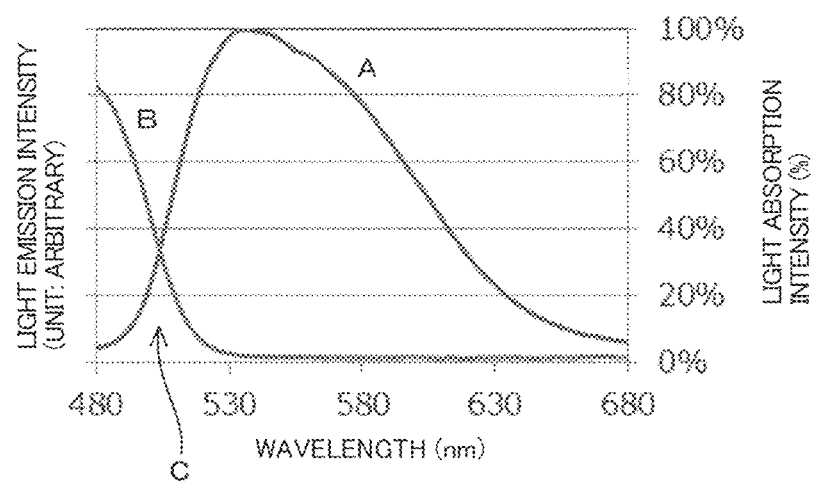
FIG. 11A and FIG. 11B is a schematic diagram of an optical spectrum of light emitted from an energy generation unit and a first light-emitting layer, and a schematic diagram of an optical spectrum of light emitted from a second light-emitting layer respectively.
Figure 11B:
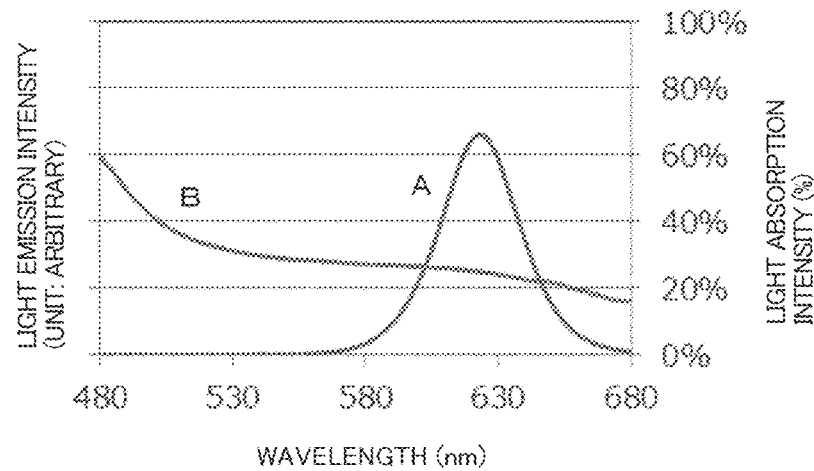
Figure 12:
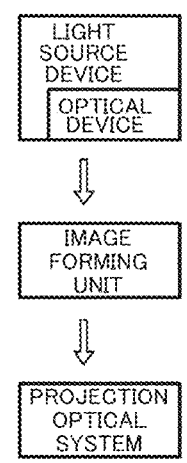
FIG. 12 is a conceptual diagram of an optical path in a projector.

Embodiment 1 is related to the optical device, the light source device and the projector of the present disclosure. FIG. 2A is a conceptual diagram of the optical device and the light source device of Embodiment 1, and FIG. 1A, FIG. 1B, FIG. 1C and FIG. 1D are conceptual diagrams of the behavior of light in the optical device and the light source device of Embodiment 1. FIG. 2B and FIG. 2C are schematic diagrams of an optical spectrum of the light emitted from the optical device of Embodiment 1 and that of the light emitted from a conventional optical device, FIG. 11A is a schematic diagram of an optical spectrum of the light emitted from the energy generation unit and the first light-emitting layer, FIG. 11B is a schematic diagram of an optical spectrum of the light emitted from the second light-emitting layer, and FIG. 12 is a conceptual diagram of an optical path of the projector. In FIG. 11A and FIG. 11B, the curve "A" indicates a light emission spectrum, and the curve "B" indicates an adsorption spectrum.

The optical device 10A of Embodiment 1 or later mentioned optical devices 10B, 10C, 10D, 10E and 10F of Embodiment 2 to Embodiment 6 includes: a light-emitting layer structure 20, 20' constituted of a first light-emitting layer 21, 21' and a second light-emitting layer 22; and a wavelength selection unit 30. The wavelength selection unit 30 is disposed on one side (light-emitting side) of the light-emitting layer structure 20, 20'. The first light-emitting layer 21, 21' emits light $51_1$ having a first wavelength region, and the second light-emitting layer 22 emits light $51_2$ having a second wavelength region based on the light $51_1$, emitted from the first light-emitting layer 21, 21'. The wavelength selection unit 30 allows parts $51_{1-1}$ and $51_{1-2}$ of the light $51_1$ having the first wavelength region emitted from the light-emitting layer structure 20, 20' to pass through, returns the remaining light $51_{1-3}$ to the light-emitting layer structure 20, 20', and allows light $51_2$ having the second wavelength region to pass through.

The light source device of Embodiment 1 or later mentioned Embodiment 2 to Embodiment 6 includes: an optical device, which includes the light-emitting layer structure 20, 20' constituted of the first light-emitting layer 21, 21' and the second light-emitting layer 22, and the wavelength selection unit 30; and an energy generation unit. The optical device is the optical device 10A of Embodiment 1 or 10B, 10C, 10D, 10E or 10F of the later mentioned Embodiment 2 to Embodiment 6.

The projector of Embodiment 1 includes: a light source device equipped with an optical device, which includes a light-emitting layer structure 20, 20' constituted of a first light-emitting layer 21 and a second light-emitting layer 22 and a wavelength selection unit 30, and an energy generation unit; an illumination optical system; an image forming unit; and a projection optical system. The optical device is the later mentioned optical device 10A, 10B, 10C, 10D, 10E or 10F of the later mentioned Embodiment 2 to Embodiment 6. An image is formed by the image forming unit using a light passed through the wavelength selection unit 30 (specifically, using the light which passed through the wavelength selection unit 30 and propagated through the illumination optical system). The image formed by the image forming unit is sent to the projection optical system.

In the optical device 10A of Embodiment 1, the wavelength selection unit 30 allows light $51_{1-1}$ in a first wavelength band and light $51_{1-2}$ in a second wavelength band out of the light $51_1$ in the first wavelength region emitted from the light-emitting layer structure 20 to pass through. Here as indicated in FIG. 2B, an optical spectrum of the light $51_2$ in the second wavelength region (see region "C" in FIG. 2B) and an optical spectrum of the light $51_{1-2}$ in the second wavelength band (see region "C'" in FIG. 2B) at least partially overlap.

In the optical device 10A of Embodiment 1, the second light-emitting layer 22 further emits light $51_2$ having the second wavelength region based on the remaining light $51_{1-3}$ of the light $51_1$ having the first wavelength region, which was returned to the light-emitting layer structure 20 by the wavelength selection unit 30. The first light-emitting layer 21 does not absorb the remaining light $51_{1-3}$ of the light $51_1$ having the first wavelength region, which was returned to the light-emitting layer structure 20 by the wavelength selection unit 30. Further, a lens system 25 is disposed between one side of the light-emitting layer structure 20 and the wavelength selection unit 30, and the light which passes through the lens system 25 and propagates to the wavelength selection unit 30 is converted into a parallel light (collimated light) by the lens system 25. The light-emitting layer structure 20 is disposed at the focal point position of the lens system 25.

The first light-emitting layer 21 emits light $51_1$ having the first wavelength region based on the energy supplied from the energy generation unit 50. The energy generation unit 50 is constituted of a light-emitting element, and the energy supplied from the energy generation unit 50 to the first light-emitting layer 21 is light $51_3$ having a third wavelength region.

Furthermore, a light reflection unit 24 is disposed on another side of the light-emitting layer structure 20, and the light from the energy generation unit enters the light-emitting layer structure 20 from the one side of the light-emitting layer structure 20. In other words, the optical device 10A of Embodiment 1 is a reflection type optical device. The optical device 10A further includes a light transmission/reflection unit 40. The light from the energy generation unit 50 is reflected by the light transmission/reflection unit 40, passes through the wavelength selection unit 30 and enters the light-emitting layer structure 20, and the light, which was emitted from the light-emitting layer structure 20 and passed through the wavelength selection unit 30, passes through the light transmission/reflection unit 40.

In Embodiment 1, a material constituting the first light-emitting layer 21 which emits yellow light may be such a fluorescent material as Ce:YAG and Ce:LuAG. In the case of Ce:YAG or Ce:LuAG, the ratio of red light is small as a spectral shape thereof indicates, therefore it is preferable that the second light-emitting layer is constituted of a material which absorbs light in a long wavelength region (see region "C" in FIG. 2B) and emits red light. A material constituting the second light-emitting layer 22 which emits red light may be quantum dots, Eu:CASN that is a fluorescent material of which basic composition is $AlSiN_3$:Eu or Eu:SCASN that is a fluorescent material of which basic composition is (Sr, Ca)$AlSiN_3$:Eu. The first light-emitting layer 21 and the second light-emitting layer 22 are laminated, and the light-emitting layers 21 and 22 are held by resin binder or glass binder. The light-emitting layer structure 20 is disposed on the support substrate 23 so that the second light-emitting layer 22 of the light-emitting layer structure 20 faces the support substrate 23 via the light reflection unit 24. The light reflection unit 24 is constituted of a thin metal film (e.g. thin film of silver, aluminum or an alloy thereof), a dielectric multilayer film, or an inorganic sintered material film, for example. The support substrate 23 may be a substrate constituted of such material as aluminum, copper, molybdenum or an alloy thereof, or a substrate constituted of ceramic, sapphire or glass, for example. The energy generation unit 50 is constituted of a blue light-emitting laser elements. The dichroic mirror constituting the light transmission/reflection unit 40 may be designed so that [A] light from the energy generation unit 50 (e.g. blue light) is reflected by the light transmission/reflection unit 40, and [B] light, which was emitted from the light-emitting layer structure 20 and passed the wavelength selection unit 30 (e.g. green light and red light), passes through the light transmission/reflection unit 40. The light, which was emitted from the energy generation unit 50 (e.g. blue light), entered the light-emitting layer structure 20, and was emitted directly from the light-emitting layer structure 20 (e.g. blue light), or the light reflected by the light-emitting layer structure 20 (e.g. blue light) is reflected by the light transmission/reflection unit 40, and returns to the energy generation unit 50. In principle, description and illustration of this blue light will be omitted in the following description and drawings.

The behavior of light in the optical device and the light source device of Embodiment 1 will now be described with reference to FIG. 1A, FIG. 1B, FIG. 1C and FIG. 1D. The behavior of the light illustrated in FIG. 1A, FIG. 1B, FIG. 1C and FIG. 1D are supposed to be illustrated in one drawing, but are illustrated separately in FIG. 1A, FIG. 1B, FIG. 1C and FIG. 1D to simplify illustration. This is the same for FIG. 4A, FIG. 4B, FIG. 5A, FIG. 5B, FIG. 6B, FIG. 6C, FIG. 6D, FIG. 7B, FIG. 7C, FIG. 8A, FIG. 8B, FIG. 9B, FIG. 9C, FIG. 10A and FIG. 10B.

Figure 2A:
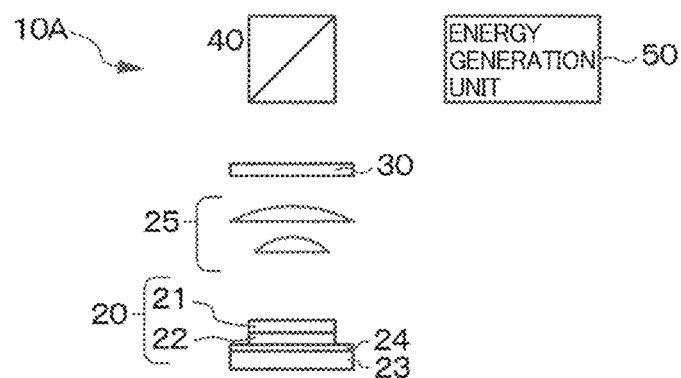
FIG. 2A, FIG. 2B and FIG. 2C are conceptual diagrams illustrating the optical device and the light source device of Embodiment 1, a schematic diagram depicting an optical spectrum of light emitted from the optical device of Embodiment 1, and a schematic diagram depicting an optical spectrum of light emitted from a conventional optical device respectively.
Figure 2B:
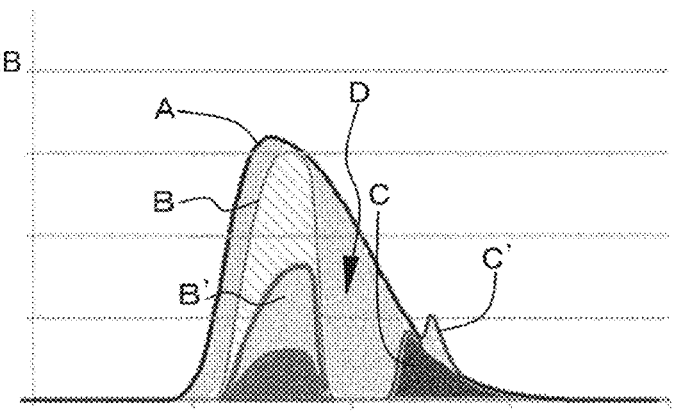
Figure 2C:
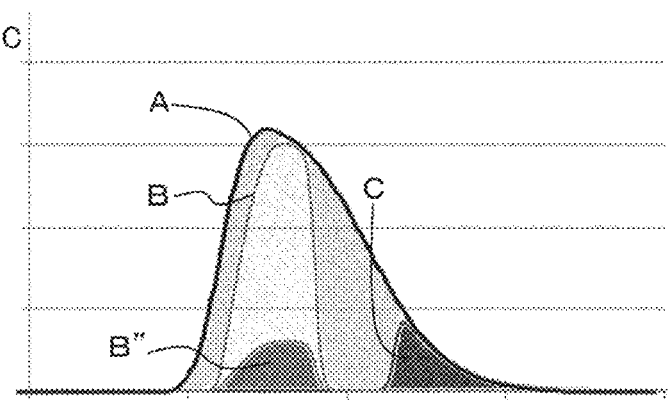

As illustrated in FIG. 1A, the blue light $51_3$ (indicated by a thin solid line) emitted from the energy generation unit 50, which is constituted of the blue light-emitting laser elements, enters the light transmission/reflection unit 40, is reflected by the light transmission/reflection unit 40, propagates to the wavelength selection unit 30, passes through the wavelength selection unit 30, and collides with the first light-emitting layer 21.

Figure 1B:
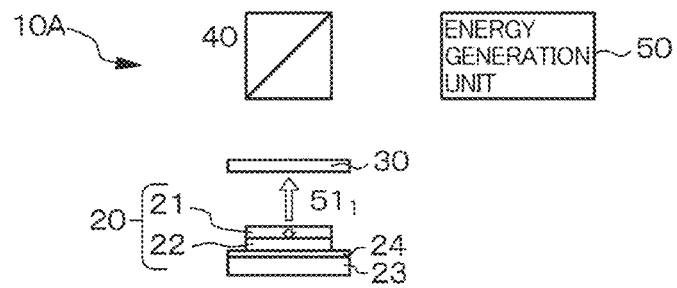

Then the first light-emitting layer 21 emits the light $51_1$ having the first wavelength region. Specifically, as illustrated in FIG. 1B, the first light-emitting layer 21 emits the light $51_1$ having the first wavelength region (yellow light) by the blue light $51_3$ colliding with the first light-emitting layer 21. The light $51_1$ having the first wavelength region is indicated by the white arrow. A part of the light $51_1$ having the first wavelength region (light indicated by the long white arrow) propagates to the wavelength selection unit 30, and the remaining light $51_1$ having the first wavelength region (light indicated by the short white arrow) enters the second light-emitting layer 22.

Figure 1C:
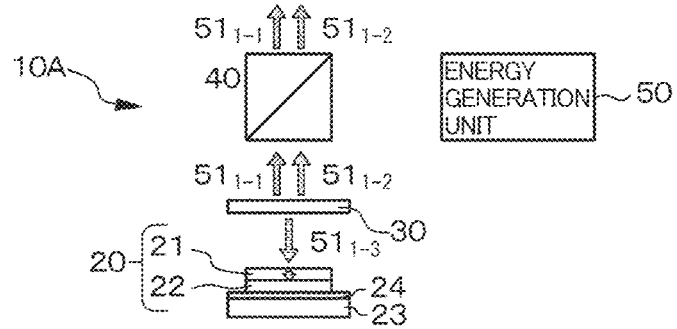

As illustrated in FIG. 1B, the light having the first wavelength region $51_1$ propagating to the wavelength selection unit 30 (light indicated by the long white arrow) collides with the wavelength selection unit 30. Then as illustrated in FIG. 1C, the wavelength selection unit 30 allows parts $51_{1-1}$ and $51_{1-2}$ (green light and red light) of the light $51_1$ having the first wavelength region emitted from the light-emitting layer structure 20 to pass through. The parts of the light $51_{1-1}$ and $51_{1-2}$ (green light and red light) of the light $51_1$ having the first wavelength region passes through the light transmission/reflection unit 40 and is emitted to outside the system of the optical device 10A and the light source device (illumination optical system). On the other hand, the wavelength selection unit 30 returns the remaining light $51_{1-3}$ (yellow light) of the light $51_1$ having the first wavelength region back to the light-emitting layer structure 20. The remaining light $51_{1-3}$ (yellow light) of the light $51_1$ having the first wavelength region is not absorbed by the first light-emitting layer 21, and reaches the second light-emitting layer 22.

Figure 1D:
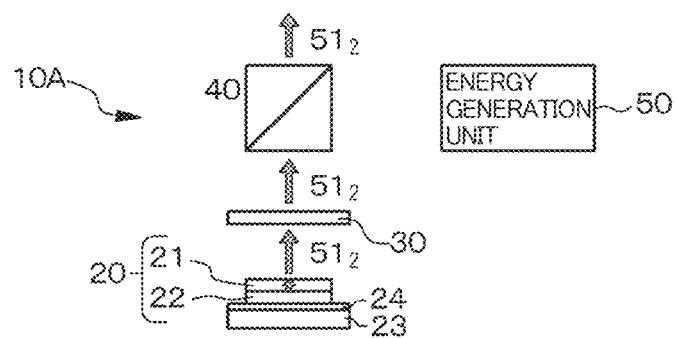

As illustrated in FIG. 1D, the second light-emitting layer 22 emits the light $51_2$ having the second wavelength region based on the light $51_1$ emitted from the first light-emitting layer 21 (see FIG. 1B). At the same time, the second light-emitting layer 22 emits the light $51_2$ having the second wavelength region based on the remaining light $51_{1-3}$ (yellow light) of the light $51_1$ having the first wavelength region, which was returned by the wavelength selection unit 30 (see FIG. 1C). The light $51_2$ having the second wavelength region (including the light $51_2$ having the second wavelength region, which was reflected by the light reflection unit 24) passes through the first light-emitting layer 21, and collides with the wavelength selection unit 30. The wavelength selection unit 30 allows the light $51_2$ having the second wavelength region to pass through. The light $51_2$ having the second wavelength region passes through the light transmission/reflection unit 40 and is emitted to outside the system of the optical device 10A and the light source device (illumination optical system).

The light emitted to the wavelength selection unit side, out of the light emitted to the shorter wavelength side of the first wavelength band in the first light-emitting layer 21, may be returned to the first light-emitting layer 21 by the wavelength selection unit 30 to excite the first light-emitting layer 21 in some cases, or may be returned to the energy generation unit 50 in other cases. The light emitted to the second light-emitting layer side, on the other hand, may excite the second light-emitting layer 22 in some cases, may be reflected by the light reflection unit 24 to excite the second light-emitting layer 22 and the first light-emitting layer 21 in other cases, or may be returned to the first light-emitting layer 21 by the wavelength selection unit 30 to excite the first light-emitting layer 21 in yet other cases. If a light source that emits blue light is independently disposed in the light source device, the red light, green light and blue light can be emitted from the light source device to outside the system of the light source device (illumination optical system).

In FIG. 2B and FIG. 2C, an emission spectrum of the first light-emitting layer 21 constituted of Ce:YAG (emission spectrum of the light $51_1$ in a first wavelength region) is schematically indicated by "A". Further in FIG. 2B and FIG. 2C, each emission spectrum of the light emitted from the first light-emitting layer 21 (light $51_{1-1}$ in the first wavelength band and the light $51_{1-2}$ in the second wavelength band) is schematically indicated by "B" and "C".

In FIG. 2C which schematically indicates the optical spectrum of the light emitted from a conventional optical device, there is a significant difference between the light intensity of the light $51_{1-1}$ in the first wavelength band (see "B") and the light intensity of the light $51_{1-2}$ in the second wavelength band (see "C"). Therefore in the case of the conventional light source device, the light intensity of the light $51_{1-1}$ in the first wavelength band is decreased using a filter, so as to adjust the white balance. The optical spectrum of the light $51_{1-1}$ in the first wavelength band in this state is schematically indicated by "B" in FIG. 2C.

On the other hand, in the optical device or the light source device of Embodiment 1, not only does the light $51_1$ having the first wavelength region enter the second light-emitting layer 22 and cause the second light-emitting layer 22 to emit light (see "C" in FIG. 2B), but also the light $51_2$ having the second wavelength region emits light from the second light-emitting layer 22 based on the remaining light $51_{1-3}$ (yellow light) of the light $51_1$ having the first wavelength region, which was returned by the wavelength selection unit 30 (see "C'" in FIG. 2B). Thus in the light $51_2$ having the second wavelength region, which is emitted to outside the system (illumination optical system), the optical spectrum "C" and "C'" overlap. Therefore in order to adjust the white balance, the light intensity of the light $51_{1-1}$ in the first wavelength band is suppressed using a filter. The optical spectrum of the light $51_{1-1}$ in the first wavelength band in this state is schematically indicated by "B" in FIG. 2B, and this light intensity is higher than "B'" in FIG. 2C.

In the case where the ratio of the region D (which corresponds to the remaining light $51_{1-3}$ of the light $51_1$ having the first wavelength region) in the emission spectrum indicated in FIG. 2B with respect to the emission spectrum is assumed to be 28% and 90% of the light in the region D is assumed to be converted into the red light and emitted to outside of the system, the light quantity of the red light increases by 0.28×0.9×100=25%, and as a result of the increase in the light quantity of the red light, the quantity of the green light can also be increased by adjusting the white balance.

As described above, the optical device, the light source device or the projector of Embodiment 1 includes: the light-emitting layer structure constituted of two layers (the first light-emitting layer and the second light-emitting layer); and the wavelength selection unit. The wavelength selection unit allows a part of the light having the first wavelength region emitted from the light-emitting layer structure to pass through, returns the remaining light to the light-emitting layer structure, and allows light having the second wavelength region to pass through. Therefore the light in the wavelength band, which has been conventionally wasted when the color gamut is widened, can be recycled, and the quantity of the light having the second wavelength region and the second wavelength band increases, and as a result, a high brightness optical device, light source device or projector having a brighter and wider color gamut can be implemented. Furthermore, in a case where the light in the projector is wasted at a portion downstream of the light source device, the wasted light is converted into heat. Since exhausting this heat becomes easier, the size of the projector can be decreased. Moreover, the total energy of the light that passes through the image forming unit, including the illumination optical system, can be decreased, which improves the reliability of the entire projector.

Embodiment 2

Figure 3A:
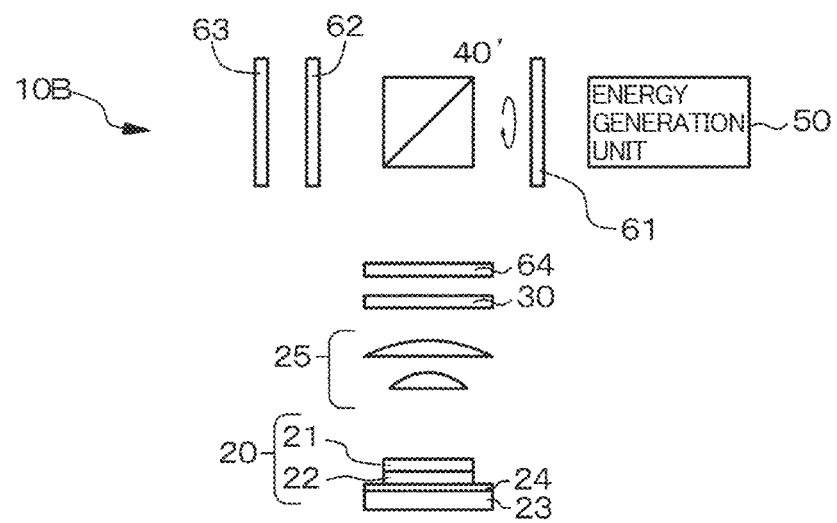
FIG. 3A and FIG. 3B are conceptual diagrams illustrating an optical device and a light source device of Embodiment 2 and Embodiment 3 respectively.

Embodiment 2 is a modification of Embodiment 1, and is related to an optical device having a first configuration. As illustrated in FIG. 3A, which is a conceptual diagram of the optical device 10B and a light source device of Embodiment 2, in Embodiment 2, a phase difference plate 61 that controls light from the energy generation unit 50 to be a first polarization state and a second polarization state; and a second light reflection unit 63 are further included. The phase difference plate 61 is disposed between the energy generation unit 50 and a light transmission/reflection unit 40'. In the first polarization state, the light which passed through the phase difference plate 61 and entered the wavelength selection unit 30 is reflected by the light transmission/reflection unit 40', passes through the wavelength selection unit 30, and enters the light-emitting layer structure 20. In the second polarization state, the light passes through the light transmission/reflection unit 40', is reflected by the second light reflection unit 63, reenters the light transmission/reflection unit 40', and is reflected by the light transmission/reflection unit 40'.

Here the light transmission/reflection unit 40' is constituted of a polarization beam splitter, and is designed so that [C] light in the s polarization state from the energy generation unit 50 (e.g. blue light) is reflected by the light transmission/reflection unit 40', and [D] light, which was emitted from the light-emitting layer structure 20 and passed through the wavelength selection unit 30 (e.g. green light and red light), passes through the light transmission/reflection unit 40'. The phase difference plate 61 is constituted of a ¼ wavelength plate ($\lambda/2$ wavelength plate), and rotates the $\lambda/2$ wavelength plate in order the control the state to become the first polarization state or the second polarization state. The second light reflection unit 63 is constituted of a thin metal film (e.g. film constituted of silver, aluminum or an alloy thereof), a dielectric multilayer film, or an inorganic sintered material film. If a diffusion structure or rotation structure is added to the second light reflection unit 63, speckles can be reduced. The polarization state of the light from the energy generation unit 50 may be uniformly set to the p polarization state using a polarization conversion element (not illustrated). A ¼ wavelength plate ($\lambda/4$ wavelength plate) 62 is disposed between the light transmission/reflection unit 40' and the second light reflection unit 63. A ¼ wavelength plate ($\lambda/4$ wavelength plate) 64 is also disposed between the light transmission/reflection unit 40' and the wavelength selection unit 30. The ¼ wavelength plate ($\lambda/4$ wavelength plate) 64 and the wavelength selection unit 30 may be integrated. Specifically, the phase difference plate may be used as a substrate constituting the wavelength selection unit 30, for example.

Figure 4A:
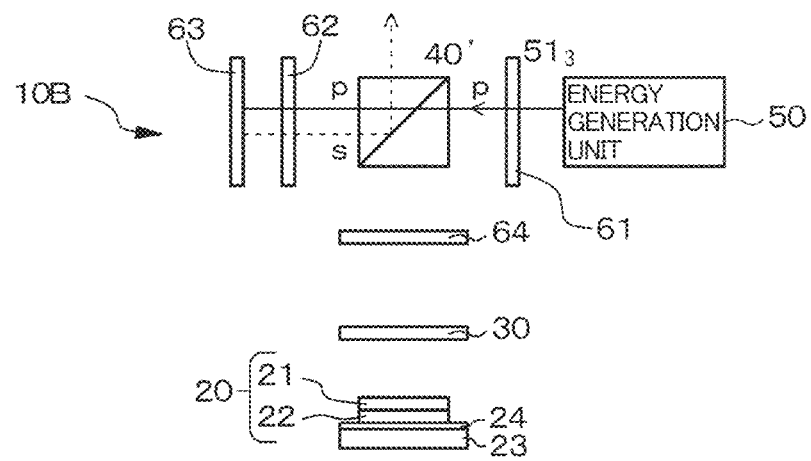
FIG. 4A and FIG. 4B are conceptual diagrams illustrating the behavior of light in the optical device and the light source device of Embodiment 2 respectively.
Figure 4B:
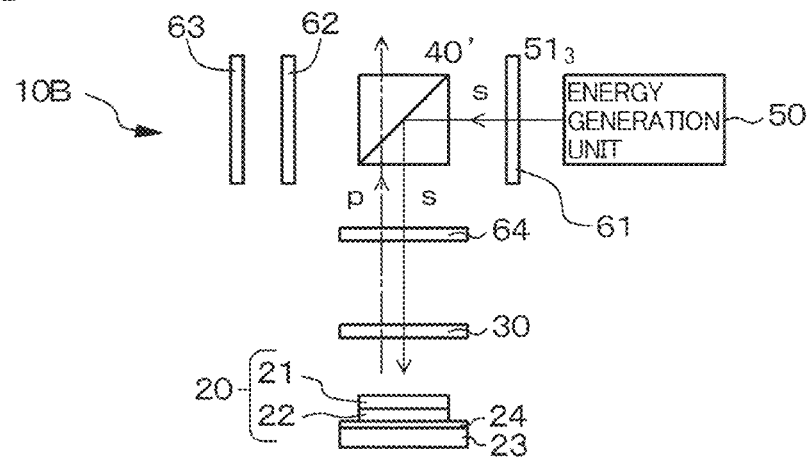

FIG. 4A and FIG. 4B are conceptual diagrams illustrating the behavior of light in the optical device 10B and the light source device of Embodiment 2.

In a case where the light in the p polarization state or the s polarization state from the energy generation unit 50, immediately before centering the $\lambda/2$ wavelength plate 61, is emitted from the $\lambda/2$ wavelength plate in the p polarization state by the rotating $\lambda/2$ wavelength plate 61, as illustrated in FIG. 4A, the light, which is in the second polarization state (p polarization state), passes through the light transmission/reflection unit 40', is reflected by the second light reflection unit 63, and reenters the light transmission/reflection unit 40'. Since the ¼ wavelength plate ($\lambda/4$ wavelength plate) 62 is disposed between the light transmission/reflection unit 40' and the second light reflection unit 63, the light which passed through the $\lambda/4$ wavelength plate 62 twice (passing through and returning) and reentered the light transmission/reflection unit 40' becomes the s polarization state, and is reflected by the light transmission/reflection unit 40' constituted of the polarization beam splitter.

On the other hand, in a case where the light in the s polarization state is emitted from the $\lambda/2$ wavelength plate 61 by the rotating $\lambda/2$ wavelength plate 61, as illustrated in FIG. 4B, the light, which is in the first polarization state (s light state), is reflected by the light transmission/reflection unit 40' constituted of the polarization beam splitter, passes through the ¼ wavelength plate ($\lambda/4$ wavelength plate) 64 and the wavelength selection unit 30, and enters the light-emitting layer structure 20. On the other hand, the light, which was emitted from the light-emitting layer structure 20 and passed through the $\lambda/4$ wavelength plate 64 (e.g. green light and red light), passes through the light transmission/reflection unit 40' constituted of the polarization beam splitter.

Light from the energy generation unit 50 (e.g. blue light), which was reflected by the light transmission/reflection unit 40 constituted of the polarization beam splitter, passed through the $\lambda/4$ wavelength plate 64, entered the light-emitting layer structure 20 and was directly emitted from the light-emitting layer structure 20 (e.g. blue light); or the light reflected by the light-emitting layer structure 20, passes through the $\lambda/4$ wavelength plate 64 and becomes the p polarization state, and passes through the light transmission/reflection unit 40' constituted of the polarization beam splitter. On the other hand, light scattered by the light-emitting layer structure 20 (e.g. blue light in non-polarized state) passes through the $\lambda/4$ wavelength plate 64, becomes the s polarization state, is reflected by the light transmission/reflection unit 40' constituted of the polarization beam splitter, and returns to the energy generation unit 50.

Except for the above aspects, the configuration and structure of the optical device, the light source device and the projector of Embodiment 2 are the same as the configuration and structure of the optical device, the light source device and the projector of Embodiment 1, therefore detailed description thereof is omitted.

Embodiment 3

Figure 3B:
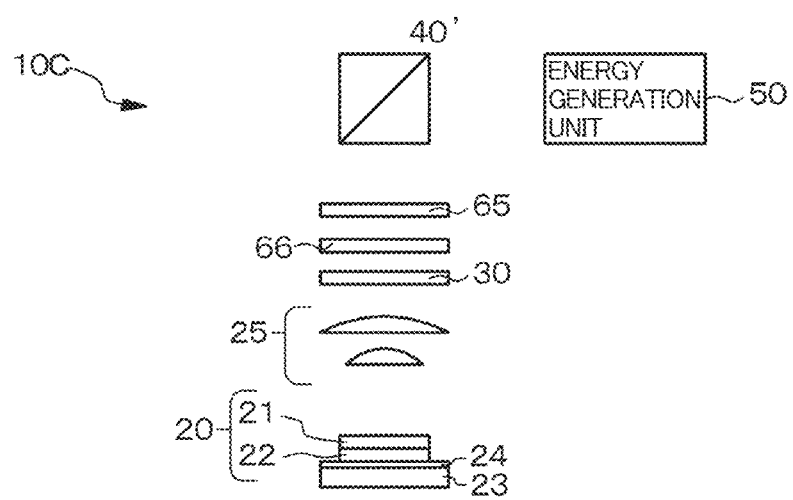

Embodiment 3 is also a modification of Embodiment 1, and is related to an optical device having a second configuration. As illustrated in FIG. 3B, which is a conceptual diagram of an optical device 10C and a light source device of Embodiment 3, in Embodiment 3, a phase difference plate 65 is disposed between the light transmission/reflection unit 40' and the wavelength selection unit 30, and a second light transmission/reflection unit 66 is disposed between the phase difference plate 65 and the wavelength selection unit 30. Light, which was reflected by the light transmission/reflection unit 40' and passed through the phase difference plate 65, is partially reflected by the second light transmission/reflection unit 66, reenters the phase difference plate 65, and passes through the phase difference plate 65 and the light transmission/reflection unit 40'. Light, which passed through the phase difference plate 65 and the second light transmission/reflection unit 66, passes through the wavelength selection unit 30 and enters the light-emitting layer structure 20.

Here the light transmission/reflection unit 40' is constituted of a polarization beam splitter similar to that of Embodiment 2. The phase difference plate 65 is constituted of a ¼ wavelength plate ($\lambda/4$ wavelength plate), and the second light transmission/reflection unit 66 is constituted of a dichroic mirror that reflects a part of the light having a third wavelength region, and allows the remaining light to pass through. The polarization state of the light from the energy generation unit 50 may be uniformly set to the s polarization state using a polarization conversion element (not illustrated). The phase difference plate 65, the second light transmission/reflection unit 66 and the wavelength selection unit 30 may be integrated. Specifically, the phase difference plate may be used as a substrate constituting the wavelength selection unit 30, for example.

Figure 5A:
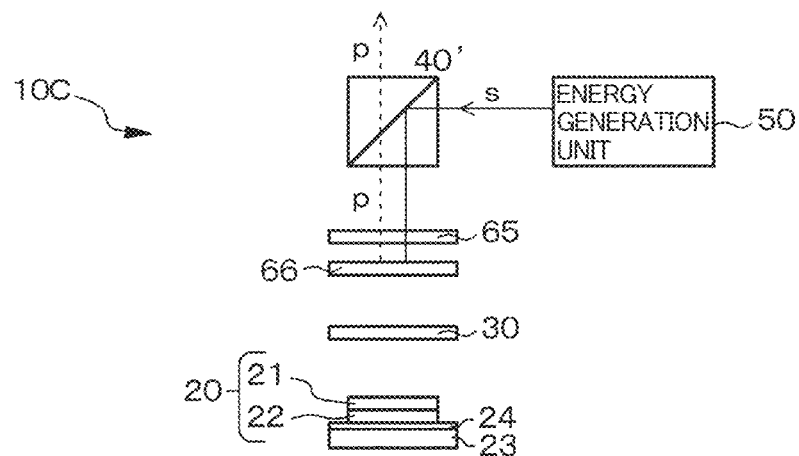
FIG. 5A and FIG. 5B are conceptual diagrams illustrating the behavior of light in the optical device and the light source device of Embodiment 3 respectively.
Figure 5B:
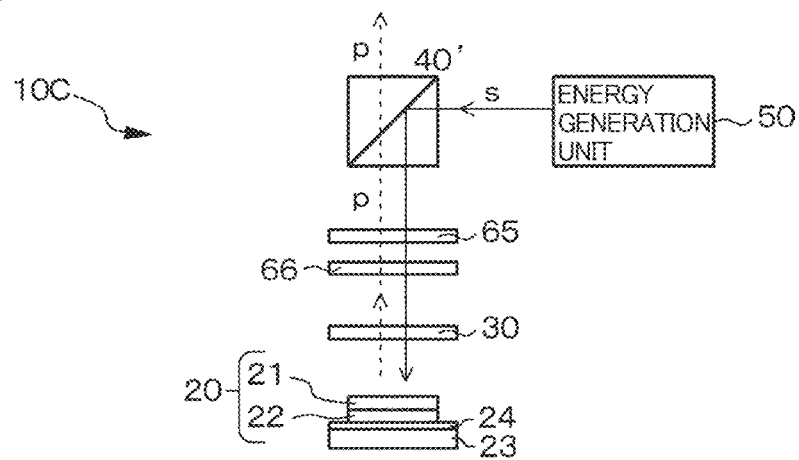

FIG. 5A and FIG. 5B are conceptual diagrams illustrating the behavior of light in the optical device 10C and the light source device of Embodiment 3.

As illustrated in FIG. 5A, the light from the energy generation unit 50 in the s polarization state is reflected by the optical transmission/reflection unit 40' constituted of the polarization beam splitter, for example. Then this light enters the phase difference plate 65, and a part of the light which passed through the phase difference plate 65 is reflected by the second light transmission/reflection unit 66, reenters the phase difference plate 65, is emitted from the phase difference plate 65 in the p polarization state, and passes through the light transmission/reflection unit 40'.

On the other hand, as illustrated in FIG. 5B, light that passed through the second light transmission/reflection unit 66 (remaining light) passes through the wavelength selection unit 30, and enters the light-emitting layer structure 20. The light emitted from the light-emitting layer structure 20 (e.g.

green light and red light) reenters the phase difference plate 65 via the second light transmission/reflection unit 66, is emitted from the phase difference plate 65, and passes through the light transmission/reflection unit 40'.

Light from the energy generation unit 50 (e.g. blue light), which entered the light-emitting layer structure 20 and was emitted directly from the light-emitting layer structure 20 (e.g. blue light), or the light reflected by the light-emitting layer structure 20 passes through the phase difference plate 65 constituted of the λ/4 wavelength plate and becomes the p polarization state, and passes through the light transmission/reflection unit 40' constituted of the polarization beam splitter. On the other hand, light scattered by the light-emitting layer structure 20 (e.g. blue line in non-polarized state) passes through the phase difference plate 65 constituted of the λ/4 wavelength plate, reaches the s polarization state, is reflected by the light transmission/reflection unit 40' constituted of the polarization beam splitter, and returns to the energy generation unit 50.

Except for the above aspects, the configuration and structure of the optical device, the light source device and the projector of Embodiment 3 are the same as the configuration and structure of the optical device, the light source device and the projector of Embodiment 1, therefore detailed description thereof is omitted.

Embodiment 4

Figure 6A:
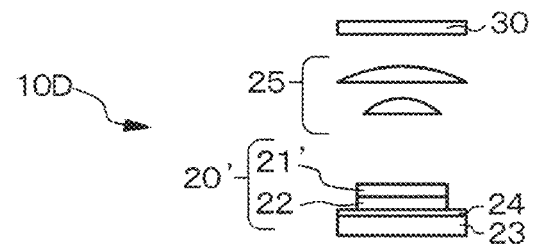
FIG. 6A is a conceptual diagram illustrating an optical device and a light source device of Embodiment 4.

Embodiment 4 is also a modification of Embodiment 1. As illustrated in FIG. 6A, which is a conceptual diagram of an optical device 10D and a light source device of Embodiment 4, in Embodiment 4, a first light-emitting layer 21' also has a function of the energy generation unit and emits light $51_1$ having a first wavelength region. Specifically, the first light-emitting layer 21' is constituted of a light-emitting element, such as a self light-emitting element (e.g. a single layer structure or a multilayer structure of LEDs including quantum dot LEDs, inorganic electroluminescence (EL) elements or inorganic EL elements).

Figure 6B:
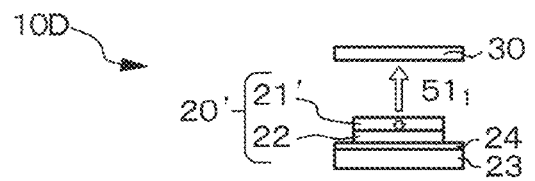
FIG. 6B, FIG. 6C and FIG. 6D are conceptual diagrams illustrating the behavior of light in the optical device and the light source device of Embodiment 4 respectively.
Figure 6C:
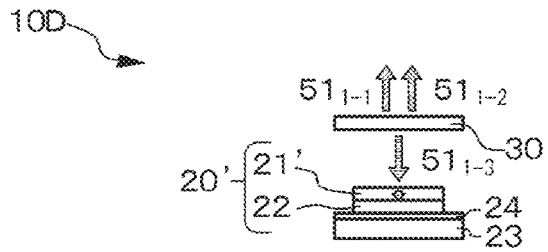
Figure 6D:
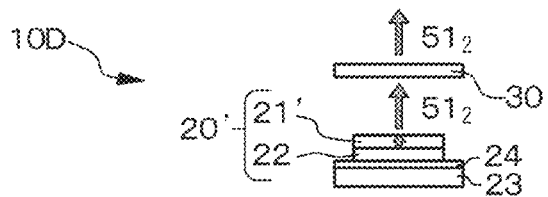

FIG. 6B, FIG. 6C and FIG. 6D are conceptual diagrams illustrating the behavior of light in the optical device 10D and the light source device of Embodiment 4.

As illustrated in FIG. 6B, light (yellow light) $51_1$ having the first wavelength region emitted from the first light-emitting layer 21' (indicated by the white arrow) propagates to the wavelength selection unit 30, and the light $51_1$ having the first wavelength region enters the second light-emitting layer 22.

As illustrated in FIG. 6C, the light $51_1$, having the first wavelength region which propagates to the wavelength selection unit 30, collides with the wavelength selection unit 30. The wavelength selection unit 30 allows a part of $51_{1-1}$ and $51_{1-2}$ (green light and red light) of the light $51_1$ having the first wavelength region, emitted from the light-emitting layer structure 20, to pass through. The parts $51_{1-1}$ and $51_{1-2}$ (green light and red light) of the light $51_1$ having the first wavelength region is emitted to outside the system of the optical device 10D and the light source device (illumination optical system). On the other hand, the wavelength selection unit 30 returns the remaining light $51_{1-3}$ (yellow light) of the light $51_1$ having the first wavelength region back to the light-emitting layer structure 20. The remaining light $51_{1-3}$ (yellow light) of the light $51_1$ having the first wavelength region is not absorbed by the first light-emitting layer 21, and reaches the second light-emitting layer 22.

As illustrated in FIG. 6D, the second light-emitting layer 22 emits light $51_2$ having the second wavelength region based on the light $51_1$ emitted from the first light-emitting layer 21 (see FIG. 6B). The second light-emitting layer 22 also emits light $51_2$ having the second wavelength region based on the remaining light $51_{1-3}$ (yellow light) of the light $51_1$ having the first wavelength region returned by the wavelength selection unit 30. The light $51_2$ having the second wavelength region (including the light $51_2$ having the second wavelength region reflected by the light reflection unit 24) passes through the first light-emitting layer 21 and collides with the wavelength selection unit 30. The wavelength selection unit 30 allows the light $51_2$ having the second wavelength region to pass through. The light $51_2$ having the second wavelength region is emitted to outside the system of the optical device 10D and the light source device (illumination optical system).

Except for the above aspects, the configuration and structure of the optical device, the light source device and the projector of Embodiment 4 are the same as the configuration and structure of the optical device, the light source device and the projector of Embodiment 1, therefore detailed description thereof is omitted.

Embodiment 5

Figure 7A:
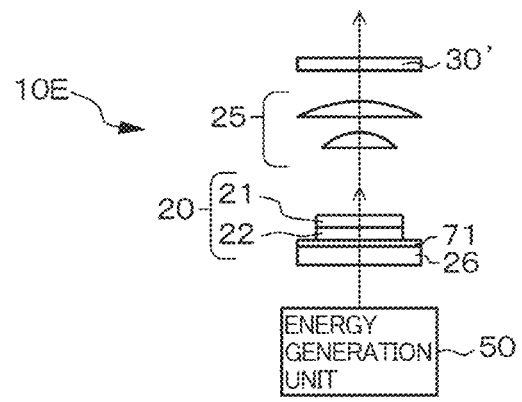
FIG. 7A is a conceptual diagram illustrating an optical device and a light source device of Embodiment 5.

Embodiment 5 is also a modification of Embodiment 1, and is related to a transmission type optical device. As illustrated in FIG. 7A, which is a conceptual diagram of an optical device 10E and a light source device of Embodiment 5, in Embodiment 5, a light transmission/reflection unit 71 is disposed on the other side of the light-emitting layer structure 20. Light from the energy generation unit 50 passes through the light transmission/reflection unit 71, and enters the light-emitting layer structure 20 from the other side of the light-emitting layer structure 20. The light emitted from the light-emitting layer structure 20 is reflected by the light transmission/reflection unit 71.

In Embodiment 5, the support substrate 26 may be a substrate constituted of sapphire or glass, and the wavelength selection unit 30' may be a dichroic mirror, for example. The light transmission/reflection unit 71 may be constituted of a dichroic mirror. In the case of using a dichroic mirror for the light transmission/reflection unit 71 here, the light transmission/reflection unit 71 may be designed so that [E] light from the energy generation unit 50 (e.g. blue light) passes through the light transmission/reflection unit 71, and [F] light emitted from the light-emitting layer structure 20 (e.g. green light and red light) is reflected by the light transmission/reflection unit 71.

FIG. 7B, FIG. 7C, FIG. 8A and FIG. 8B are conceptual diagrams illustrating the behavior of light in the optical device 10E and the light source device of Embodiment 5.

Figure 7B:
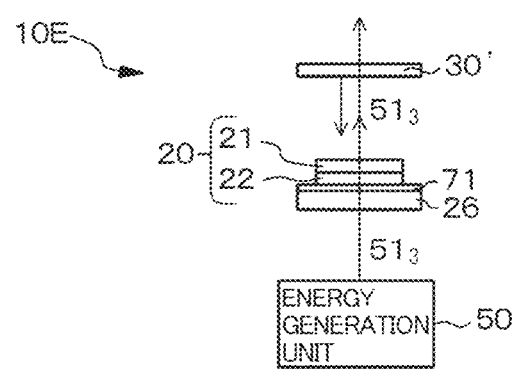
FIG. 7B and FIG. 7C are conceptual diagrams illustrating the behavior of light in the optical device and the light source device of Embodiment 5 respectively.

As illustrated in FIG. 7B, blue light $51_3$ having the third wavelength region (indicated by the thin solid line) emitted from the energy generation unit 50 constituted of the blue light-emitting laser element passes through the light transmission/reflection unit 71 and the second light-emitting layer 22, and collides with the first light-emitting layer 21. A part of the blue light $51_3$ having the third wavelength region passes through the first light-emitting layer 21 and the wavelength selection unit 30', and is emitted to outside the system of the optical device 10E and the light source device (illumination optical system).

Figure 7C:
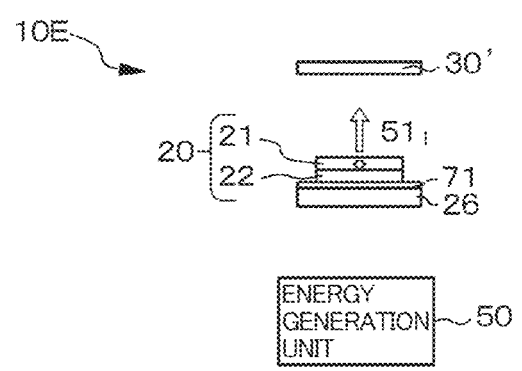

On the other hand, the first light-emitting layer 21 emits light $51_1$ having the first wavelength region by the remaining light of the blue light $51_3$ having the third wavelength region which collided with the first light-emitting layer 21. Specifically, as illustrated in FIG. 7C, the blue light $51_3$ collides with the first light-emitting layer 21, whereby the first light-emitting layer 21 emits the light 51$_1$ (yellow light) having the first wavelength region. The light 51$_1$ having the first wavelength region is indicated by the white arrow. The part of the light 51$_1$ having the first wavelength region propagates to the wavelength selection unit 30', and the remaining of the light 51$_1$ having the first wavelength region enters the second light-emitting layer 22.

Figure 8A:
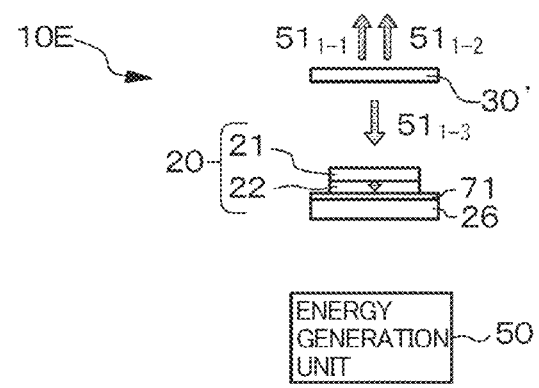
FIG. 8A and FIG. 8B are conceptual diagrams illustrating the behavior of light in the optical device and the light source device of Embodiment 5 respectively.

As illustrated in FIG. 8A, the light 51$_1$ having the first wavelength region, which propagates to the wavelength selection unit 30', collides with the wavelength selection unit 30'. The wavelength selection unit 30' allows parts 51$_{1-1}$ and 51$_{1-2}$ (green light and red light) of the light 51$_1$ having the first wavelength region emitted from the light-emitting layer structure 20 to pass through. The part 51$_{1-1}$ and 51$_{1-2}$ (green light, red light) of the light 51$_1$ having the first wavelength region is emitted to outside the system of the optical device 10E and the light source device (illumination optical system). On the other hand, the wavelength selection unit 30' returns the remaining light 51$_{1-3}$ (yellow light) of the light 51$_1$ having the first wavelength region back to the light-emitting layer structure 20. The remaining light 51$_{1-3}$ (yellow light) of the light 51$_1$ having the first wavelength region is not absorbed by the first light-emitting layer 21, and reaches the second light-emitting layer 22.

Figure 8B:
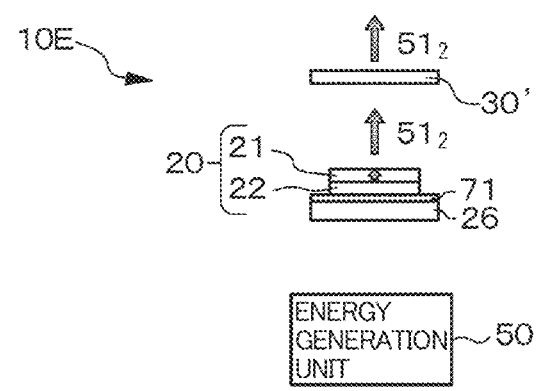

As illustrated in FIG. 8B, the second light-emitting layer 22 emits the light 51$_2$ having the second wavelength region based on the light 51$_1$ emitted from the first light-emitting layer 21 (see FIG. 7C). The second light-emitting layer 22 also emits the light 51$_2$ having the second wavelength region based on the remaining light 51$_{1-3}$ (yellow light) of the light 51$_1$ having the first wavelength region, which was returned by the wavelength selection unit 30'. The light 51$_2$ having the second wavelength region (including the light 51$_2$ having the second wavelength region which was reflected by the light transmission/reflection unit 71) passes through the first light-emitting layer 21 and collides with the wavelength selection unit 30'. The wavelength selection unit 30' allows the light 51$_2$ having the second wavelength region to pass through. The light 51$_2$ having the second wavelength region is emitted to outside the system of the optical device 10E and the light source device (illumination optical system).

Embodiment 6

Figure 9A:
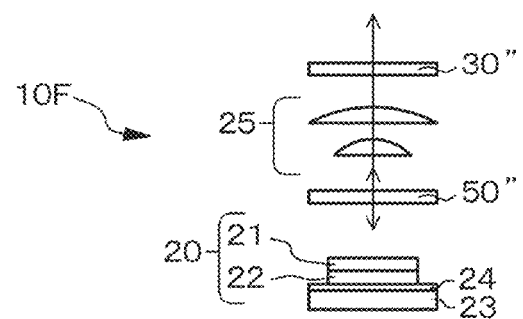
FIG. 9A is a conceptual diagram illustrating an optical device and a light source device of Embodiment 6.

Embodiment 6 is also a modification of Embodiment 1. As illustrated in FIG. 9A, which is a conceptual diagram of an optical device 10F and a light source device of Embodiment 6, in the Embodiment 6, an energy generation unit 50" is disposed between the light-emitting layer structure 20 and a wavelength selection unit 30", and emits light 51$_3$ having the third wavelength region. Specifically, the energy generation unit 50" is constituted of a light-emitting element, such as a self light-emitting element (e.g. a single layer structure or multilayer structure of LEDs including quantum dot LEDs, organic electroluminescence (EL) elements or inorganic EL elements). The wavelength selection unit 30" may be constituted of a dichroic mirror. The dichroic mirror may be designed so that [G] a part of the light from the energy generation unit 50" (e.g. blue light) is passed, and [H] the remaining of the light from the energy generation unit 50" is reflected, a part of the light emitted from the light-emitting layer structure 20 (e.g. green light and red light) is passed, and the remaining light (e.g. yellow light) is reflected.

FIG. 9B, FIG. 9C, FIG. 10A and FIG. 10B are conceptual diagrams illustrating the behavior of light in the optical device 10F and the light source device of Embodiment 6.

Figure 9B:
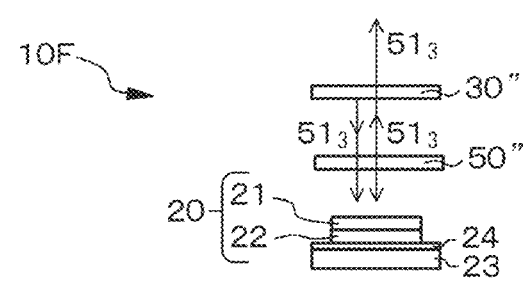
FIG. 9B and FIG. 9C are conceptual diagrams illustrating the behavior of light in the optical device and the light source device of Embodiment 6 respectively.

As illustrated in FIG. 9B, light (blue light) 51$_3$ having the third wavelength region (indicated by the thin solid line) emitted from the energy generation unit 50" propagates to the wavelength selection unit 30", and the light 51$_3$ having the third wavelength region enters the first light-emitting layer 21. Then the wavelength selection unit 30" constituted of the dichroic mirror allows a part of the light 51$_3$ having the third wavelength region (blue light) to pass through and reflects the remaining light. The remaining of the light 51$_3$ having the third wavelength region (blue light) which was reflected by the wavelength selection unit 30" passes through the energy generation unit 50", and enters the first light-emitting layer 21.

Figure 9C:
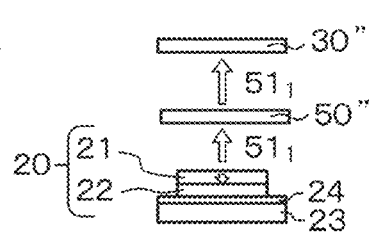

As illustrated in FIG. 9C, the first light-emitting layer 21 is excited by the light 51$_3$ having the third wavelength region (blue light), and emits the light 51$_1$ having the first wavelength region (yellow light). The light 51$_1$ having the first wavelength region is indicated by the white arrow. A part of the light 51$_1$ having the first wavelength region (light indicated by the long white arrow) passes through the energy generation unit 50" and propagates to the wavelength selection unit 30", and the remaining light of the light 51$_1$ having the first wavelength region (light indicated by the short white arrow) enters the second light-emitting layer 22.

Figure 10A:
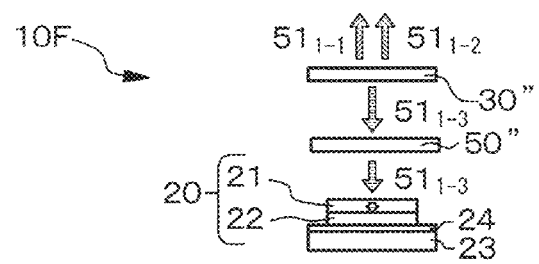
FIG. 10A and FIG. 10B are conceptual diagrams illustrating the behavior of light in the optical device and the light source device of Embodiment 6 respectively.

As illustrated in FIG. 10A, the light 51$_1$ having the first wavelength region propagating to the wavelength selection unit 30" (light indicated by the long white arrow) collides with the wavelength selection unit 30". Then the wavelength selection unit 30" allows parts 51$_{1-1}$ and 51$_{1-2}$ (green light, red light) of the light 51$_1$ having the first wavelength region emitted from the light-emitting layer structure 20 to pass through. The parts 51$_{1-1}$ and 51$_{1-2}$ (green light and red light) of the light 51$_1$ having the first wavelength region is emitted to outside the system of the optical device 10A and the light source device (illumination optical system). On the other hand, the wavelength selection unit 30" returns the remaining light 51$_{1-3}$ (yellow light) of the light 51$_1$ having the first wavelength region back to the light-emitting layer structure 20. The remaining light 51$_{1-3}$ (yellow light) of the light 51$_1$ having the first wavelength region is not absorbed by the energy generation unit 50" and the first light-emitting layer 21, and reaches the second light-emitting layer 22.

Figure 10B:
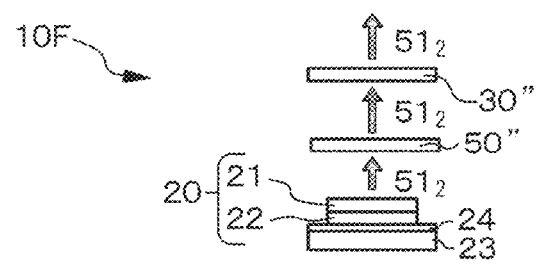

As illustrated in FIG. 10B, the second light-emitting layer 22 emits the light 51$_2$ having the second wavelength region based on the light 51$_1$ emitted from the first light-emitting layer 21 (see FIG. 9C). At the same time, the second light-emitting layer 22 emits the light 51$_2$ having the second wavelength region based on the remaining light 51$_{1-3}$ (yellow light) of the light 51$_1$ having the first wavelength region, which was returned by the wavelength selection unit 30" (see FIG. 10A). The light 51$_2$ having the second wavelength region (including the light 51$_2$ having the second wavelength region, which was reflected by the light reflection unit 24) passes through the first light-emitting layer 21 and the energy generation unit 50", and collides with the wavelength selection unit 30". The wavelength selection unit 30" allows the light 51$_2$ having the second wavelength region to pass through. The light 51$_2$ having the second wavelength region is emitted to outside the system of the optical device 10A and the light source device (illumination optical system).

Except for the above aspects, the configuration and structure of the optical device, the light source device and the projector of Embodiment 6 are the same as the configuration and structure of the optical device, the light source device and the projector of Embodiment 1, therefore detailed description thereof is omitted.

While the optical device, the light source device and the projector of the present disclosure have been described based on preferred embodiments, the configuration and structure of the optical device, the light source device and the projector of the present disclosure are examples which may be appropriately changed, and the materials constituting the optical device of the present disclosure are also examples which may be appropriately changed.

The illumination optical system, the image forming unit and the projection optical system constituting the projector of the present disclosure may be an illumination optical system, an image forming unit and a projection optical system that are well known.

The projector is constituted of the light source device, the illumination optical system, the image forming unit and the projection optical system. The light emitted from the light source device enters the illumination optical system and is shaped to have a uniform spatial profile. The light emitted from the illumination optical system is spatially or temporarily dispersed by the image forming unit, and forms an image. There are generally three types of configuration of the image forming unit: (1) a three-panel type using a panel for red light which forms an image based on the red light, a panel for green light which forms an image based on the green light, and a panel for blue light which forms an image based on the blue light, (2) a single-panel type using one panel by temporarily modulating light from the light source device, and (3) a two-panel type which has a configuration between (1) and (2). For the panel, a transmission type or a reflection type liquid crystal panel, MEMS mirror panel or the like may be used, for example. An image formed on the panel is projected onto a surface, an object or a space by the projection optical system.

Figure 13:
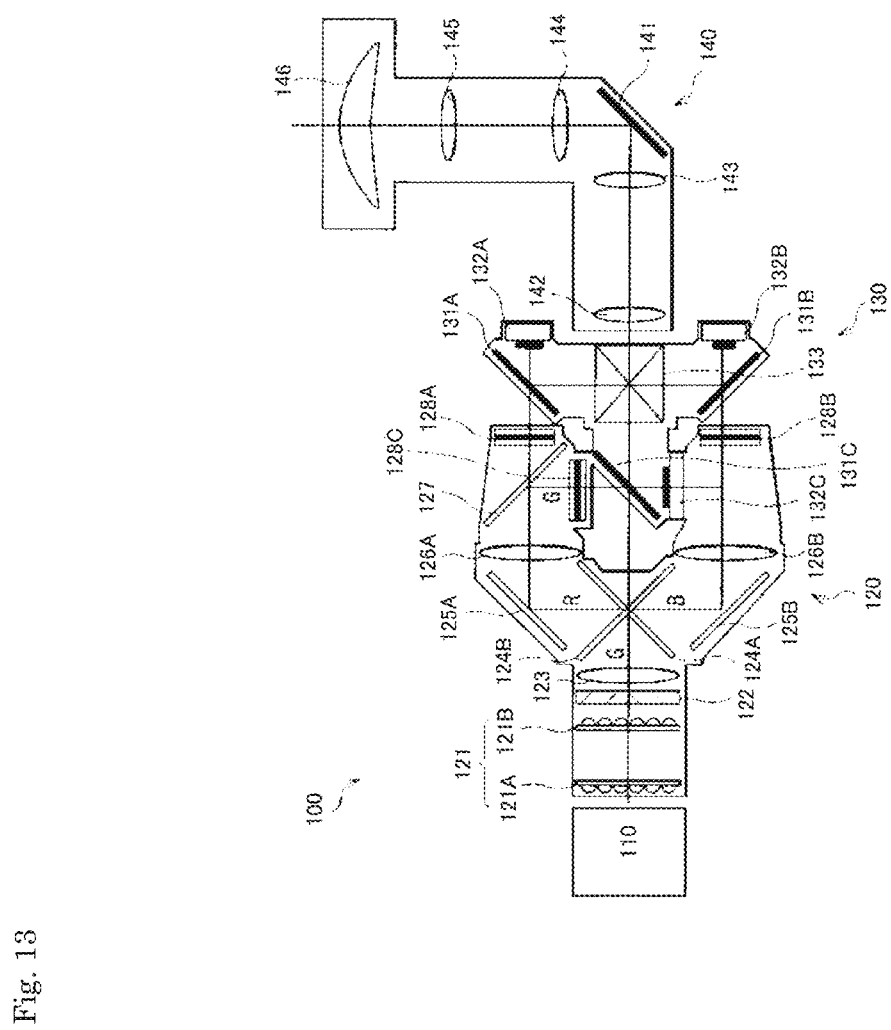
FIG. 13 is a schematic diagram illustrating the projector.

A configuration of the projector will be described with reference to FIG. 13. FIG. 13 is a schematic diagram illustrating a general configuration of a projector 100 equipped with the light source device 110. Here a reflection type three-LCD projector, which performs optical modulation using reflection type liquid crystal panels (LCDs), will be described as an example. The light source device 110 can be any one of the light source devices described in Embodiment 1 to Embodiment 6.

The projector 100 includes the light source device 110, an illumination optical system 120, an image forming unit 130 and a projection optical system 140 in this sequence.

The illumination optical system 120 includes, in order from the position of the light source device 110, fly-eye lenses 121 (121A, 121B), a polarization conversion element 122, a lens 123, dichroic mirrors 124A, 124B, reflection mirrors 125A, 125B, lenses 126A, 126B, a dichroic mirror 127, and polarization plates 128A, 128B and 128C.

The fly-eye lenses 121 (121A, 121B) homogenizes the luminance distribution of white light from the light source device 110. The polarization conversion element 122 functions to set the polarization axis of incident light in a predetermined direction, and converts light, other than p polarization light, into the p polarization light, for example. The lens 123 collects the light from the polarization conversion element 122 toward the dichroic mirrors 124A and 124B. Each dichroic mirror 124A and 124B selectively reflects the light in a predetermined wavelength region, and selectively transmits the light in the other wavelength region. For example, the dichroic mirror 124A reflects mainly the red light toward the reflection mirror 125A. The dichroic mirror 124B reflects mainly the blue light toward the reflection mirror 125B. This means that mainly the green light transmits through both of the dichroic mirrors 124A and 124B, and propagates to the reflection type polarization plate 131C of the image forming unit 130. The reflection mirror 125A reflects the light from the dichroic mirror 124A (mainly red light) toward the lens 126A, and the reflection mirror 125B reflects the light from the dichroic mirror 124B (mainly blue light) toward the lens 126B. The lens 126A transmits the light from the reflection mirror 125A (mainly red light), and collects the light toward the dichroic mirror 127. The lens 126B transmits the light from the reflection mirror 125B (mainly blue light), and collects the light toward the polarization plate 128B. The dichroic mirror 127 selectively reflects the green light and selectively transmits the light in the other wavelength region. Here red light components, out of the light from the transmission lens 126A, are transmitted. In a case where the light from the transmission lens 126A includes green light components, the green light components are reflected toward the polarization plate 128C. Each of the polarization plates 128A, 128B and 128C include a polarizer which has a polarization axis in a predetermined direction. For example, in a case where the polarization conversion element 122 converts the light into p polarization light, each of the polarization plates 128A, 128B and 128C transmits the p polarization light, and reflects the s polarization light.

The image forming unit 130 includes reflection type polarization plates 131A, 131B and 131C, reflection type liquid crystal panels 132A, 132B and 132C, and a dichroic prism 133.

Each reflection type polarization plate 131A, 131B and 131C transmits the light having the same polarization axis as the polarization axis of the polarization light from each polarization plate 128A, 128B and 128C (e.g. p polarization light) respectively, and reflects light having the other polarization axis (s polarization light). Specifically, the reflection type polarization plate 131A transmits the p-polarized red light from the polarization plate 128A toward the reflection type liquid crystal panel 132A. The reflection type polarization plate 131B transmits the p-polarized blue light from the polarization plate 128B toward the reflection type liquid crystal panel 132B. The reflection type polarization plate 131C transmits the p-polarized green light from the polarization plate 128C toward the reflection type liquid crystal panel 132C. The p-polarized green light, which transmitted through both the dichroic mirrors 124A and 124B and entered the reflection type polarization plate 131C, directly transmits through the reflection type polarization plate 131C and enters the dichroic prism 133. Further, the reflection type polarization plate 131A reflects the s-polarized red light from the reflection type liquid crystal panel 132A, and allows it to enter the dichroic prism 133. The reflection type polarization plate 131B reflects the s-polarized blue light from the reflection type liquid crystal panel 132B, and allows it to enter the dichroic prism 133. The reflection type polarization plate 131C reflects the s-polarized green light from the reflection type liquid crystal panel 132C, and allows it to enter the dichroic prism 133.

Each reflection type liquid crystal panel 132A, 132B and 132C performs spatial modulation of the red light, blue light and the green light respectively.

The dichroic prism 133 combines the red light, the blue light and the green light that entered and emits the combined light toward the projection optical system 140. The projection optical system 140 includes lenses 142 to 146 and a mirror 141. The projection optical system 140 magnifies the light emitted from the image forming unit 130, and projects the magnified light to a screen (not illustrated), or the like.

Figure 14:
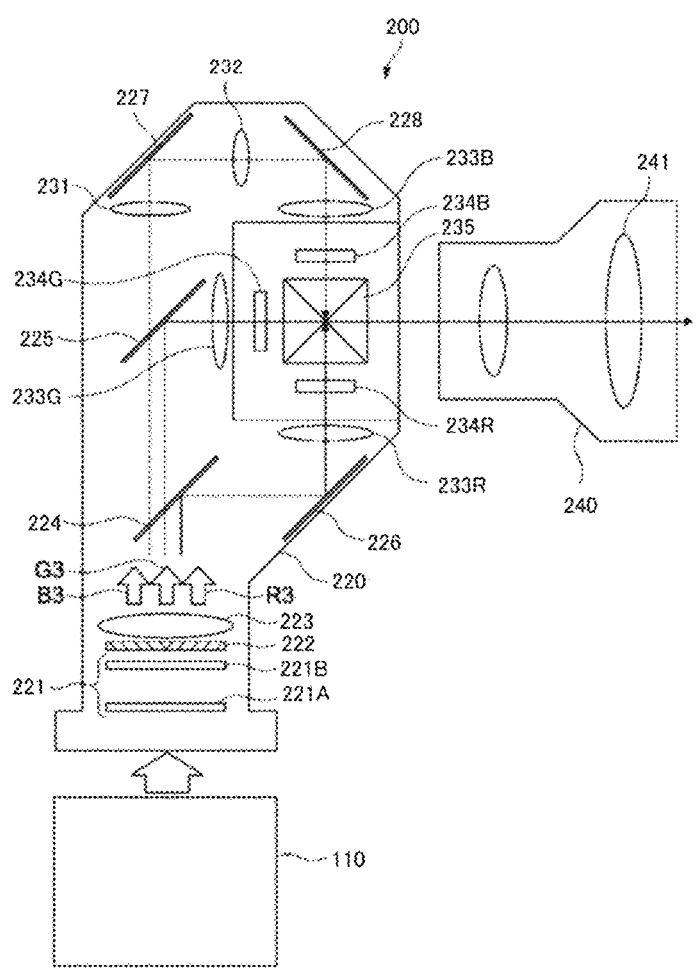
FIG. 14 is a schematic diagram illustrating a projector that has a different form from the projector in FIG. 13.

FIG. 14 is a schematic diagram of a projector having a different configuration. This projector is a transmission type three-LCD projector which performs optical modulation using transmission type liquid crystal panels (LCDs).

The projector 200 includes a light source device 110, an image forming unit 220 (including an illumination optical system) that generates an image using light emitted from the light source device 110, and a projection optical system 240 that projects light of an image generated by the image forming unit 220.

The image forming unit 220, including the illumination optical system, includes an integrator element 221, a polarization conversion element 222, a condensing lens 223, dichroic mirrors 224 and 225, mirrors 226, 227 and 228, and relay lenses 231 and 232. The image forming unit 220 includes field lenses 233 (233R, 233G, 233B), liquid crystal light valves 234R, 234G and 234B, and a dichroic prism 235.

The integrator element 221 has a function to adjust the incident light from the light source device 110, with which the liquid crystal light valves 234R, 234G and 234B are irradiated, to have a homogenous brightness distribution. For example, the integrator element 221 includes a first fly-eye lens 221A having a plurality of micro-lenses (not illustrated) which are two-dimensionally arrayed, and a second fly-eye lens 221B having a plurality of micro-lenses which are arrayed so as to correspond to the above mentioned micro-lenses one-on-one.

Collimated light that enters from the light source device 110 to the integrator element 221 is separated into a plurality of rays by the micro-lenses of the first fly-eye lens 221A, and images thereof are formed on the corresponding micro-lenses of the second fly-eye lens 221B respectively. Each micro lens of the second fly-eye lens 221B functions as a secondary light source, and emits a plurality of collimated light to the polarization conversion element 222 as the incident light.

The polarization conversion element 222 has a function to uniformly set the polarization state of the incident light which enters via the integrator element 221, and the like. This polarization conversion element 222 emits light, including the blue light B3, the green light G3 and the red light R3, via the condensing lens 223, and the like, disposed on the emission side of the light source device 110, for example.

The dichroic mirrors 224 and 225 have a characteristic to selectively reflect light in a predetermined wavelength range, and transmit light in the other wavelength range. For example, the dichroic mirror 224 selectively reflects the red light R3. The dichroic mirror 225 selectively reflects the green light G3, out of the green light G3 and the blue light B3 which transmitted through the dichroic mirror 224. The remaining blue light B3 transmits through the dichroic mirror 225. Thereby the light emitted from the light source device 110 is separated into a plurality of light having different colors.

The separated red light R3 is reflected by the mirror 226, is collimated while passing through the field lens 233R, then enters the liquid crystal light valve 234R for modulating the red light. The green light G3 is collimated while passing through the field lens 233G, then enters the liquid crystal light valve 234G for modulating the green light. The blue light B3 passes through the relay lens 231, is reflected by the mirror 227, then passes through the relay lens 232 and is reflected by the mirror 228. The blue light B3 reflected by the mirror 228 is collimated while passing through the field lens 233B, then enters the liquid crystal light valve 234B for modulating the blue light.

The liquid crystal light valves 234R, 234G and 234B are electrically connected with a signal source (e.g. personal computer) that supplies image signals including image formation (not illustrated). Each liquid crystal light valve 234R, 234G and 234B modulates the incident light for each pixel, based on the supplied image signal of each color, and generates the red image, the green image and the blue image respectively. The modulated light of each color (formed image) enters the dichroic prism 235 and is combined. The dichroic prism 235 merges the light of each color which entered from three directions, and emits the combined light toward the projection optical system 240.

The projection optical system 240 includes a plurality of lenses 241, and the like, and emits the light combined by the dichroic prism 235 to a screen (not illustrated). Thereby a full color image is displayed.

The present disclosure may have the following configurations.

[A01]

<Optical Device>

An optical device including:

a light-emitting layer structure constituted of a first light-emitting layer and a second light-emitting layer; and a wavelength selection unit, wherein the wavelength selection unit is disposed on one side of the light-emitting layer structure, the first light-emitting layer emits light having a first wavelength region, the second light-emitting layer emits light having a second wavelength region based on light emitted from the first light-emitting layer, and the wavelength selection unit allows a part of light having the first wavelength region emitted from the light-emitting layer structure to pass through, returns the remaining light to the light-emitting layer structure, and allows light having the second wavelength region to pass through.

[A02]

The optical device according to [A01], wherein the wavelength selection unit allows light in a first wavelength band and a second wavelength band to pass through, out of the first wavelength region from the light-emitting layer structure, and the second wavelength region and the second wavelength band at least partially overlap.

[A03]

The optical device according to [A01] or [A02], wherein the second light-emitting layer further emits light having the second wavelength region based on the remaining light in the first wavelength region returned to the light-emitting layer structure by the wavelength selection unit.

[A04]

The optical device according to any one of [A01] to [A03], wherein the first light-emitting layer does not absorb the remaining light in the first wavelength region returned to the light-emitting layer structure by the wavelength selection unit.

[A05]

The optical device according to any one of [A01] to [A04], wherein a lens system is disposed between one side of the light-emitting layer structure and the wavelength selection unit, and light that passes through the lens system and propagates to the wavelength selection unit is converted into collimated light by the lens system.

[A06]

The optical device according to any one of [A01] to [A05], wherein the first light-emitting layer emits light having the first wavelength region based on energy supplied from an energy generation unit.

[A07]

The optical device according to [A06], wherein the energy generation unit is constituted of a light-emitting element.

[A08]

The optical device according to [A07], wherein the energy supplied from the energy generation unit to the first light-emitting layer is light having a third wavelength region.

[A09]

The optical device according to [A08], wherein a light reflection unit is disposed on another side of the light-emitting layer structure, and light from the energy generation unit enters the light-emitting layer structure from the one side of the light-emitting layer structure.

[A10]

The optical device according to [A09], further including a light transmission/reflection unit, wherein light from the energy generation unit is reflected by the light transmission/reflection unit, passes through the wavelength selection unit, and enters the light-emitting layer structure, and light emitted from the light-emitting layer structure and passed through the wavelength selection unit, passes through the light transmission/reflection unit.

[A11]

The optical device according to [A10], further including:

a phase difference plate that controls light from the energy generation unit to be a first polarization state and a second polarization state; and a second light reflection unit, wherein the phase difference plate is disposed between the energy generation unit and the light transmission/reflection unit, and in the first polarization state, light which passed through the phase difference plate and entered the wavelength selection unit is reflected by the light transmission/reflection unit, passes through the wavelength selection unit, and enters the light-emitting layer structure, and in the second polarization state, light passes through the light transmission/reflection unit, is reflected by the second light reflection unit, reenters the light transmission/reflection unit, and is reflected by the light transmission/reflection unit.

[A12]

The optical device according to [A10], wherein a phase difference plate is disposed between the light transmission/reflection unit and the wavelength selection unit, a second light transmission/reflection unit is disposed between the phase difference plate and the wavelength selection unit, light which was reflected by the light transmission/reflection unit and passed through the phase difference plate is partially reflected by the second light transmission/reflection unit, reenters the phase difference plate, and passes through the phase difference plate and the light transmission/reflection unit, and light which passed through the phase difference plate and the second light transmission/reflection unit passes through the wavelength selection unit and enters the light-emitting layer structure.

[A13]

The optical device according to [A08], wherein a light transmission/reflection unit is disposed on the other side of the light-emitting layer structure, light from the energy generation unit passes through the light transmission/reflection unit and enters the light-emitting layer structure from the other side of the light-emitting layer structure, and light emitted from the light-emitting layer structure is reflected by the light transmission/reflection unit.

[A14]

The optical device according to any one of [A01] to [A05], wherein the first light-emitting layer also plays a function of an energy generation unit, and emits light having the first wavelength region.

[A15]

The optical device according to [A14], wherein the first light-emitting layer is constituted of a light-emitting element.

[A16]

The optical device according to [A08], wherein the energy generation unit is disposed between the light-emitting layer structure and the wavelength selection unit.

[B01]

<Light Source Device>

A light source device including:

an optical device which includes a light-emitting layer structure constituted of a first light-emitting layer and a second light-emitting layer, and a wavelength selection unit; and an energy generation unit, wherein the wavelength selection unit is disposed on one side of the light-emitting layer structure, the first light-emitting layer emits light having a first wavelength region, the second light-emitting layer emits light having a second wavelength region based on light emitted from the first light-emitting layer, and the wavelength selection unit allows a part of light having the first wavelength region emitted from the light-emitting layer structure to pass through, returns the remaining light to the light-emitting layer structure, and allows light having the second wavelength region to pass through.

[B02]

<Light Source Device>

A light source device including:

the optical device according to any one of [A01] to [A16]; and an energy generation unit, wherein the wavelength selection unit is disposed on one side of the light-emitting layer structure, the first light-emitting layer emits light having a first wavelength region, the second light-emitting layer emits light having a second wavelength region based on light emitted from the first light-emitting layer, and the wavelength selection unit allows a part of light having the first wavelength region emitted from the light-emitting layer structure to pass through, returns the remaining light to the light-emitting layer structure, and allows light having the second wavelength region to pass through.

[C01]

<Projector>

A projector including:

a light source device equipped with an optical device, which includes a light-emitting layer structure constituted of a first light-emitting layer and a second light-emitting layer and a wavelength selection unit, and an energy generation unit;
an illumination optical system;
an image forming unit; and
a projection optical system, wherein
the wavelength selection unit is disposed on one side of the light-emitting layer structure,
the first light-emitting layer emits light having a first wavelength region,
the second light-emitting layer emits light having a second wavelength region based on light emitted from the first light-emitting layer,
the wavelength selection unit allows a part of light having the first wavelength region emitted from the light-emitting layer structure to pass through, returns the remaining light to the light-emitting layer structure, and allows light having the second wavelength region to pass through,
an image is formed by the image forming unit using light passed through the wavelength selection unit, and
the image formed by the image forming unit is sent to the projection optical system.

[C02]
<Projector>

A projector including; a light source device which includes
the optical device according to any one of [A01] to [A16], and
an energy generation unit; an illumination optical system;
an image forming unit; and
a projection optical system, wherein
the wavelength selection unit is disposed on one side of the light-emitting layer structure,
the first light-emitting layer emits light having a first wavelength region,
the second light-emitting layer emits light having a second wavelength region based on light emitted from the first light-emitting layer,
the wavelength selection unit allows a part of the light having the first wavelength region emitted from the light-emitting layer structure to pass through, returns the remaining light to the light-emitting layer structure, and
allows light having the second wavelength region to pass through,
an image is formed by the image forming unit using light passed through the wavelength selection unit, and
the image formed by the image forming unit is sent to the projection optical system.

REFERENCE SIGNS LIST 10A, 10B, 10C, 10D, 10E, 10F Optical device
20, 20' Light-emitting layer structure
21 First light-emitting layer
21' First light-emitting layer of self light emission
22 Second light-emitting layer
23, 26 Support substrate
24 Light reflection unit
25 Lens system
30, 30', 30" Wavelength selection unit
40, 40' Light transmission/reflection unit
50, 50" Energy generation unit
$51_1$ Light having first wavelength region
$51_{1\text{-}1}$, $51_{1\text{-}2}$ Part of light having first wavelength region
$51_{1\text{-}3}$ Remaining light having first wavelength region
$51_2$ Light having second wavelength region
$51_3$ Light having third wavelength region
61 Phase difference plate
62, 64 ¼ wavelength plate (λ/4 wavelength plate)
63 Second light reflection unit
65 Phase difference plate (¼ wavelength plate (λ/4 wavelength plate))
66 Second light transmission/reflection unit
71 Light transmission/reflection unit

What is claimed is:

1. An optical device comprising:
a light-emitting layer structure constituted of a first light-emitting layer and a second light-emitting layer; and a wavelength selection unit, wherein
the wavelength selection unit is disposed on one side of the light-emitting layer structure,
the first light-emitting layer emits light having a first wavelength region,
the second light-emitting layer emits light having a second wavelength region based on light emitted from the first light-emitting layer, and
the wavelength selection unit allows a part of light having the first wavelength region emitted from the light-emitting layer structure to pass through, returns the remaining light to the light-emitting layer structure, and allows light having the second wavelength region to pass through.

2. The optical device according to claim 1, wherein
the wavelength selection unit allows light in a first wavelength band and a second wavelength band to pass through, out of the first wavelength region from the light-emitting layer structure, and
the second wavelength region and the second wavelength band at least partially overlap.

3. The optical device according to claim 1, wherein
the second light-emitting layer further emits light having the second wavelength region based on the remaining light in the first wavelength region returned to the light-emitting layer structure by the wavelength selection unit.

4. The optical device according to claim 1, wherein
the first light-emitting layer does not absorb the remaining light in the first wavelength region returned to the light-emitting layer structure by the wavelength selection unit.

5. The optical device according to claim 1, wherein
a lens system is disposed between one side of the light-emitting layer structure and the wavelength selection unit, and
light that passes through the lens system and propagates to the wavelength selection unit is converted into collimated light by the lens system.

6. The optical device according to claim 1, wherein
the first light-emitting layer emits light having the first wavelength region based on energy supplied from an energy generation unit.

7. The optical device according to claim 6, wherein
the energy generation unit is constituted of a light-emitting element.

8. The optical device according to claim 7, wherein
the energy supplied from the energy generation unit to the first light-emitting layer is light having a third wavelength region.

9. The optical device according to claim 8, wherein
a light reflection unit is disposed on another side of the light-emitting layer structure, and
light from the energy generation unit enters the light-emitting layer structure from the one side of the light-emitting layer structure.

10. The optical device according to claim 9, further comprising
a light transmission/reflection unit, wherein
light from the energy generation unit is reflected by the light transmission/reflection unit, passes through the wavelength selection unit, and enters the light-emitting layer structure, and
light emitted from the light-emitting layer structure and passed through the wavelength selection unit passes through the light transmission/reflection unit.

11. The optical device according to claim 10, further comprising:
a phase difference plate that controls light from the energy generation unit to be a first polarization state and a second polarization state; and a second light reflection unit, wherein
the phase difference plate is disposed between the energy generation unit and the light transmission/reflection unit, and
in the first polarization state, light which passed through the phase difference plate and entered the wavelength selection unit is reflected by the light transmission/reflection unit, passes through the wavelength selection unit, and enters the light-emitting layer structure, and in the second polarization state, light passes through the light transmission/reflection unit, is reflected by the second light reflection unit, reenters the light transmission/reflection unit, and is reflected by the light transmission/reflection unit.

12. The optical device according to claim 10, wherein
a phase difference plate is disposed between the light transmission/reflection unit and the wavelength selection unit,
a second light transmission/reflection unit is disposed between the phase difference plate and the wavelength selection unit,
light which was reflected by the light transmission/reflection unit and passed through the phase difference plate is partially reflected by the second light transmission/reflection unit, reenters the phase difference plate, and passes through the phase difference plate and the light transmission/reflection unit, and
light which passed through the phase difference plate and the second light transmission/reflection unit passes through the wavelength selection unit and enters the light-emitting layer structure.

13. The optical device according to claim 8, wherein
a light transmission/reflection unit is disposed on another side of the light-emitting layer structure,
light from the energy generation unit passes through the light transmission/reflection unit and enters the light-emitting layer structure from another side of the light-emitting layer structure, and
light emitted from the light-emitting layer structure is reflected by the light transmission/reflection unit.

14. A light source device comprising:
an optical device which includes a light-emitting layer structure constituted of a first light-emitting layer and a second light-emitting layer, and a wavelength selection unit; and
an energy generation unit, wherein
the wavelength selection unit is disposed on one side of the light-emitting layer structure,
the first light-emitting layer emits light having a first wavelength region,
the second light-emitting layer emits light having a second wavelength region based on light emitted from the first light-emitting layer, and
the wavelength selection unit allows a part of light having the first wavelength region emitted from the light-emitting layer structure to pass through, returns the remaining light to the light-emitting layer structure, and allows light having the second wavelength region to pass through.

15. A projector comprising:
a light source device equipped with an optical device which includes a light-emitting layer structure constituted of a first light-emitting layer and a second light-emitting layer and a wavelength selection unit, and an energy generation unit;
an illumination optical system;
an image forming unit; and
a projection optical system, wherein
the wavelength selection unit is disposed on one side of the light-emitting layer structure,
the first light-emitting layer emits light having a first wavelength region,
the second light-emitting layer emits light having a second wavelength region based on light emitted from the first light-emitting layer,
the wavelength selection unit allows a part of the light having the first wavelength region emitted from the light-emitting layer structure to pass through, returns the remaining light to the light-emitting layer structure, and allows light having the second wavelength region to pass through,
an image is formed by the image forming unit using light passed through the wavelength selection unit, and
the image formed by the image forming unit is sent to the projection optical system.

* * * * *